US012623882B2

(12) United States Patent
Kawamura et al.

(10) Patent No.: US 12,623,882 B2
(45) Date of Patent: May 12, 2026

(54) BOOKLET MAKING APPARATUS AND IMAGE FORMING APPARATUS

(71) Applicant: CANON KABUSHIKI KAISHA, Tokyo (JP)

(72) Inventors: Koji Kawamura, Kanagawa (JP); Yasuhiro Nakahara, Kanagawa (JP); Atsushi Kawarago, Shizuoka (JP); Kazushi Nishikata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/606,031

(22) Filed: Mar. 15, 2024

(65) Prior Publication Data

US 2024/0317534 A1 Sep. 26, 2024

(30) Foreign Application Priority Data

Mar. 20, 2023 (JP) ................................ 2023-044784

(51) Int. Cl.
*B42C 9/00* (2006.01)
*B42C 1/12* (2006.01)
*B65H 37/04* (2006.01)

(52) U.S. Cl.
CPC ............... *B65H 37/04* (2013.01); *B42C 1/12* (2013.01); *B65H 2511/13* (2013.01); *B65H 2553/40* (2013.01); *B65H 2801/27* (2013.01)

(58) Field of Classification Search
CPC ........ B42B 5/00; B42C 1/12; G03G 15/6544; G03G 2215/00835; B65H 37/02;
(Continued)

(56) References Cited

U.S. PATENT DOCUMENTS 6,308,948 B1 * 10/2001 Azumi ...................... B42C 1/12 270/58.08
6,736,388 B2 * 5/2004 Lawrence .............. B65H 37/04 412/8

(Continued)

FOREIGN PATENT DOCUMENTS

EP 1116600 A2 7/2001
EP 2465694 A1 6/2012

(Continued)

OTHER PUBLICATIONS

U.S. Appl. No. 18/609,566, filed Mar. 19, 2024 (First Named Inventor: Yasuhiro Nakahara).

(Continued)

*Primary Examiner* — Leslie A Nicholson, III
(74) *Attorney, Agent, or Firm* — Venable LLP

(57) ABSTRACT

A booklet making apparatus includes a heat-and-pressure bonding portion including a pressurizing member, a receiving member, a moving portion configured to move the pressurizing member, and a heating portion configured to heat the pressurizing member. The booklet making apparatus is configured to nip, heat, and pressurize, between the pressurizing member and the receiving member, a plurality of sheets on at least one of which an adhesive layer is formed, and thus make a booklet. The booklet making apparatus further includes an elastic member. A deformation amount of the elastic member is constant while the moving portion moves from a first position to a second position. In a case where the moving portion moves from the second position to a third position, the deformation amount of the elastic member increases in accordance with a movement amount the moving portion.

22 Claims, 23 Drawing Sheets

(58) Field of Classification Search
CPC .......... B65H 37/04; B65H 2301/43822; B65H 2511/13; B65H 2553/40; B65H 2801/27
USPC ....................................................... 270/58.08
See application file for complete search history.

(56) References Cited

U.S. PATENT DOCUMENTS

| | | | | |
|---|---|---|---|---|
| 6,926,791 | B2 | 8/2005 | Boss | |
| 8,838,014 | B2 | 9/2014 | Matsue et al. | |
| 9,725,274 | B2 * | 8/2017 | Taguchi | B65H 37/02 |
| 9,764,582 | B2 * | 9/2017 | Taguchi | B65H 45/18 |
| 11,097,919 | B2 * | 8/2021 | Matsumoto | B31F 1/07 |
| 11,215,946 | B2 | 1/2022 | Koyama | |
| 11,279,586 | B2 | 3/2022 | Nakahara | |
| 11,662,683 | B2 | 5/2023 | Koyama | |
| 11,718,496 | B2 | 8/2023 | Nakahara | |
| 11,796,955 | B2 | 10/2023 | Monden | |
| 2014/0072388 | A1 * | 3/2014 | Hashimoto | G03G 15/6544 412/1 |
| 2014/0227064 | A1 * | 8/2014 | Matsue | B42C 13/003 412/37 |
| 2023/0348222 | A1 | 11/2023 | Kawamura | |
| 2024/0174016 | A1 | 5/2024 | Nakahara | |

FOREIGN PATENT DOCUMENTS

| | | | |
|---|---|---|---|
| JP | 2000-015605 | A | 1/2000 |
| JP | 2000-255881 | A | 9/2000 |
| JP | 2004-209859 | A | 7/2004 |
| JP | 2014-151579 | A | 8/2014 |

OTHER PUBLICATIONS

Search Report dated Dec. 17, 2024, in European Patent Application No. 24164100.0.
Search Report dated Sep. 26, 2024, in European Patent Application No. 24164100.0.
Office Action dated Dec. 10, 2025, in Korean Patent Application No. 10-2024-0036924.

* cited by examiner

BOOKLET MAKING APPARATUS AND IMAGE FORMING APPARATUS

BACKGROUND OF THE INVENTION

Field of the Invention

The present invention relates to a booklet making apparatus that makes a booklet by bonding sheets together, and an image forming apparatus that forms an image on a sheet.

Description of the Related Art

Japanese Patent Application Laid-Open No. 2000-255881 discloses a configuration in which a toner image for bonding is formed on a binding margin portion of each sheet by an image forming apparatus body, then sheets are stacked in a post-processing apparatus, and then the sheet bundle is heated and pressurized by a heater plate to bond the sheets together to create a booklet.

However, in this case, there is a possibility that the deformation amount at the time of bonding of a coupling spring or a return spring that applies force to the heater plate changes in accordance with the thickness of the sheet bundle to be bonded, and thus the pressurizing force applied by the heater plate to the sheets does not become a desired value.

SUMMARY OF THE INVENTION

The present invention can provide a booklet making apparatus and an image forming apparatus capable of adjusting a pressurizing force for bonding sheets together to a desired value.

According to an aspect of the invention, a booklet making apparatus includes a heat-and-pressure bonding portion configured to heat and pressurize a sheet, the heat-and-pressure bonding portion including a pressurizing member configured to come into contact with and pressurize the sheet, a receiving member configured to oppose the pressurizing member, a moving portion configured to move the pressurizing member such that the pressurizing member and the receiving member nip and pressurize the sheet, and a heating portion configured to heat the pressurizing member, wherein the booklet making apparatus is configured to nip, heat, and pressurize, between the pressurizing member and the receiving member, a plurality of sheets on at least one of which an adhesive layer is formed, and thus make a booklet in which the plurality of sheets are bonded to each other via the adhesive layer, wherein the booklet making apparatus further includes an elastic member configured to generate an urging force for applying a pressure between the pressurizing member and the receiving member, and wherein in a case where a first position is a position of the moving portion in a case of retracting the pressurizing member from the plurality of sheets, a second position is a position of the moving portion when the pressurizing member comes into contact with the plurality of sheets in a case where the pressurizing member is moved from a position retracted from the plurality of sheets toward the receiving member, and a third position is a position of the moving portion while the pressurizing member and the receiving member are pressurizing the plurality of sheets, (i) a deformation amount of the elastic member is constant while the moving portion moves from the first position to the second position, and (ii) in a case where the moving portion moves from the second position to the third position, the deformation amount of the elastic member increases in accordance with a movement amount of the moving portion from the second position.

According to another aspect of the invention, a booklet making apparatus includes a heat-and-pressure bonding portion configured to heat and pressurize a sheet, the heat-and-pressure bonding portion including a pressurizing member configured to come into contact with and pressurize the sheet, a receiving member configured to oppose the pressurizing member, a moving portion configured to move the pressurizing member such that the pressurizing member and the receiving member nip and pressurize the sheet, a heating portion configured to heat the pressurizing member, and a drive source configured to drive the moving portion, wherein the booklet making apparatus is configured to nip, heat, and pressurize, between the pressurizing member and the receiving member, a plurality of sheets on at least one of which an adhesive layer is formed, and thus make a booklet in which the plurality of sheets are bonded to each other via the adhesive layer, and wherein the booklet making apparatus further includes a controller configured to control an output of the drive source such that a pressurizing force of the pressurizing member and the receiving member pressurizing the plurality of sheets is a preset value.

According to another aspect of the invention, a booklet making apparatus includes a heat-and-pressure bonding portion configured to heat and pressurize a sheet, the heat-and-pressure bonding portion including a pressurizing member configured to come into contact with and pressurize the sheet, a receiving member configured to oppose the pressurizing member, a moving portion configured to move the pressurizing member such that the pressurizing member and the receiving member nip and pressurize the sheet, a heating portion configured to heat the pressurizing member, and a drive source configured to drive the moving portion, wherein the booklet making apparatus is configured to nip, heat, and pressurize, between the pressurizing member and the receiving member, a plurality of sheets on at least one of which an adhesive layer is formed, and thus make a booklet in which the plurality of sheets are bonded to each other via the adhesive layer, and wherein the booklet making apparatus further includes a load detection portion configured to detect a load applied to the pressurizing member or the receiving member, and a controller configured to control an output of the drive source such that the load detected by the load detection portion while the pressurizing member and the receiving member are pressurizing the plurality of sheets is a preset target value.

According to another aspect of the invention, a booklet making apparatus includes a heat-and-pressure bonding portion configured to heat and pressurize a sheet, the heat-and-pressure bonding portion including a pressurizing member configured to come into contact with and pressurize the sheet, a receiving member configured to oppose the pressurizing member, a first moving portion configured to move the pressurizing member such that the pressurizing member and the receiving member nip and pressurize the sheet, and a heating portion configured to heat the pressurizing member, wherein the booklet making apparatus is configured to nip, heat, and pressurize, between the pressurizing member and the receiving member, a plurality of sheets on at least one of which an adhesive layer is formed, and thus make a booklet in which the plurality of sheets are bonded to each other via the adhesive layer, wherein the booklet making apparatus further includes an elastic member configured to generate an urging force for applying a pressure between the pressurizing member and the receiving member, a position detection portion configured to detect information about a position of an uppermost sheet of the plurality of sheets, a second moving portion configured to move the receiving member, and a controller configured to (i) move the receiving member by the second moving portion such that the uppermost sheet moves to a preset position on a basis of a detection result of the position detection portion and (ii) cause the pressurizing member and the receiving member to pressurize the plurality of sheets by the urging force of the elastic member by moving the first moving portion by a preset moving amount.

According to another aspect of the invention, a booklet making apparatus includes a heat-and-pressure bonding portion configured to heat and pressurize a sheet, the heat-and-pressure bonding portion including a pressurizing member configured to come into contact with and pressurize the sheet, a receiving member configured to oppose the pressurizing member, a moving portion configured to move the pressurizing member such that the pressurizing member and the receiving member nip and pressurize the sheet, and a heating portion configured to heat the pressurizing member, wherein the booklet making apparatus is configured to nip, heat, and pressurize, between the pressurizing member and the receiving member, a plurality of sheets on at least one of which an adhesive layer is formed, and thus make a booklet in which the plurality of sheets are bonded to each other via the adhesive layer, wherein the booklet making apparatus further includes an elastic member configured to generate an urging force for applying a pressure between the pressurizing member and the receiving member, a drive source configured to drive the moving portion, a detection portion configured to detect contact of the pressurizing member with the plurality of sheets, and a controller configured to control a driving amount of the drive source on a basis of a detection result of the detection portion, and wherein the controller is configured to adjust a driving amount of the drive source between (i) detection of contact of the pressurizing member with the plurality of sheets by the detection portion and (ii) stoppage of the drive source.

Further features of the present invention will become apparent from the following description of exemplary embodiments with reference to the attached drawings.

DESCRIPTION OF THE EMBODIMENTS

Embodiments of the present disclosure will be described below with reference to drawings.

In the present disclosure, examples of an "image forming apparatus" widely include apparatuses that form an image on a recording material (recording medium), such as monofunctional printers having only a printing function, copiers having a copying function, multifunctional apparatuses having a plurality of functions, and commercial printers. In addition, the "image forming apparatus" may be a system (image forming system) in which an image forming apparatus body that forms an image on a recording material and devices such as a sheet processing apparatus and a sheet feeding apparatus are connected to each other.

First Embodiment

A configuration of an apparatus according to a first embodiment will be described with reference to FIGS. 1 to 9. First, a configuration of the image forming apparatus body and the outline of a sheet processing apparatus that are common to each embodiment will be described, and then the details of a heat-and-pressure bonding portion in the first embodiment will be described.

Figure 1:
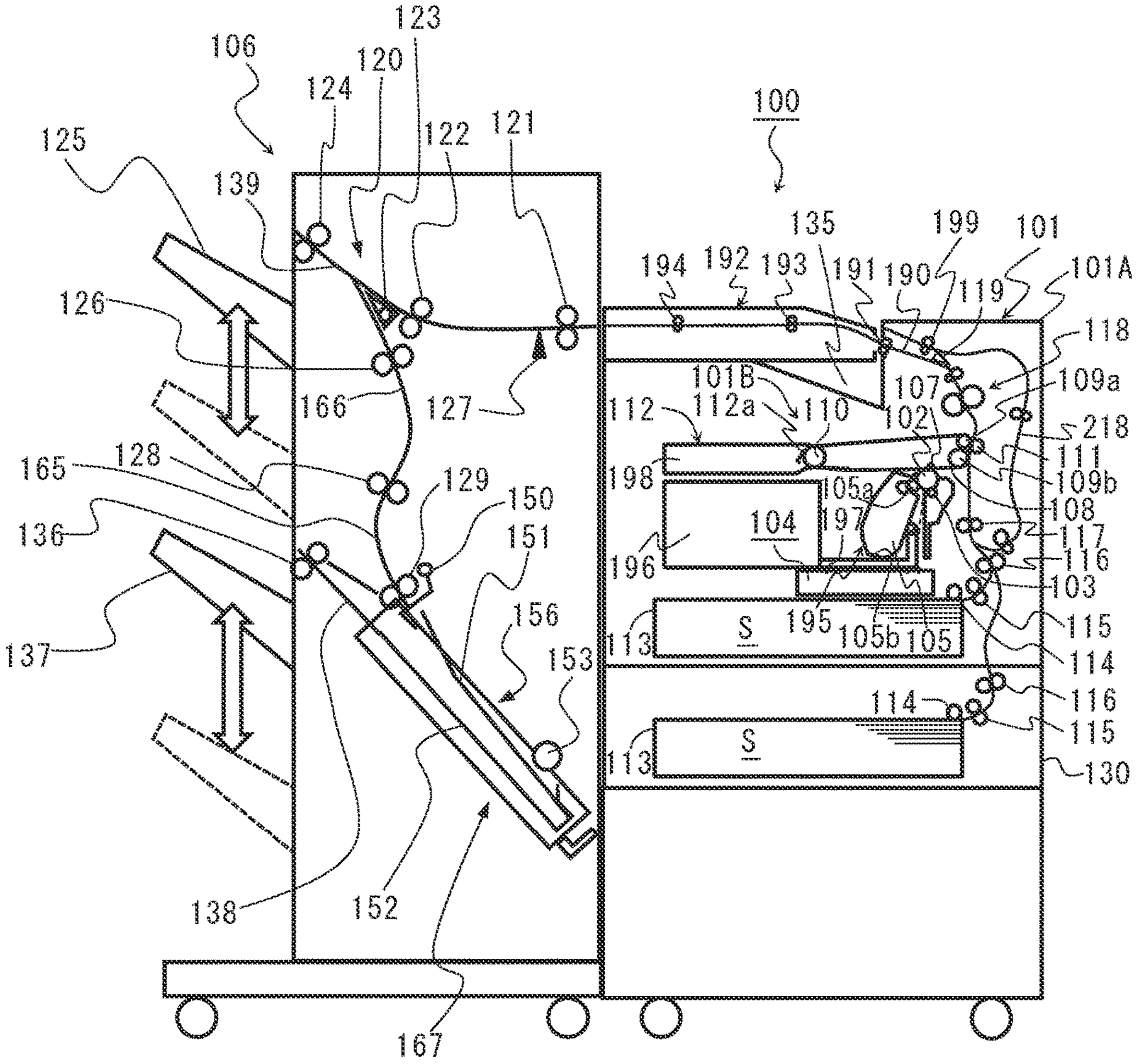
FIG. 1 is a schematic view of an image forming apparatus according to a first embodiment.

FIG. 1 is a schematic view of the image forming apparatus 100 according to the first embodiment. The image forming apparatus 100 includes a printer body 101 serving as an image forming apparatus body having an image forming function (printing function), and a sheet processing apparatus 106 having a sheet bonding function. That is, the image forming apparatus 100 can be referred to as an image forming system constituted by the printer body 101 that functions as an image forming apparatus by itself, and the sheet processing apparatus 106.

The image forming apparatus 100 of the present embodiment can create a booklet by performing printing and bookbinding in one apparatus by forming an image on sheets S one by one by the printer body 101 and performing heat-and-pressure bonding on a stack of a plurality of sheets S in the sheet processing apparatus 106. The printer body 101 can apply toner as an adhesive on each sheet S at the same time as image formation. That is, the printer body 101 can, while conveying the sheets S one by one, form an image on the sheet S and apply an adhesive on the sheet S. As the sheet S, a wide variety of sheet materials of different sizes and materials can be used. Examples of the sheet materials include paper sheets such as plain paper sheets and cardboards, surface-treated sheet materials such as coated paper sheets, plastic films, cloths, and sheet materials of irregular shapes such as envelopes and index paper sheets.

Image Forming Apparatus Body

The printer body 101 is an electrophotographic apparatus including a casing 101A, and an image forming portion 101B of an electrophotographic system accommodated in the casing 101A. The image forming portion 101B includes an intermediate transfer belt 108 serving as an intermediate transfer member, and a process cartridge 195 provided along the intermediate transfer belt 108. The image forming portion 101B is an electrophotographic unit of an intermediate transfer system. The process cartridge 195 includes a photosensitive drum 102 serving as an image bearing member, a charging unit 103 serving as a charging portion, and a developing unit 105 serving as a developing portion. In addition, the image forming portion 101B includes a scanner unit 104 serving as an exposing portion, and a primary transfer roller 107.

The developing unit 105 includes a developing roller 105*a* serving as a developing member, and a toner container 105*b* that accommodates toner (developer). The developing roller 105*a* is rotatably held by the toner container 105*b*.

The process cartridge 195 is attachable to and detachable from the casing 101A. A toner cartridge 196 accommodating toner to be supplied to the developing unit 105 is detachably attached to the printer body 101. The "casing 101A" of the printer body 101 is a portion of the printer body 101 excluding the process cartridge 195 and the toner cartridge 196. The casing 101A includes a frame member such as a metal frame constituting a frame body of the printer body 101 and a member fixed to the frame body, and defines an attachment space in which the process cartridge 195 and the toner cartridge 196 are attached.

The process cartridge 195 forms a toner image for recording an image on a sheet S by using toner, and also forms a bonding toner image (adhesive layer) for bonding sheets S together. The printer body 101 of the present embodiment has a monochromatic printer configuration that records a monochromatic image. The printer body 101 uses a black toner not only for recording an image but also as a toner (powder adhesive) for bonding. The toner for bonding does not have to be a black toner, and may be a toner dedicated to bonding different from a toner used for recording an image. For example, the printer body 101 may include a process cartridge 195 accommodating toner (powder adhesive) dedicated to bonding in addition to a process cartridge 195 accommodating a color toner for recording an image.

The toner cartridge 196 and the process cartridge 195 attached to the casing 101A are connected to each other via a toner conveyance pipe 197. The toner cartridge 196 can supply toner to the developing unit 105 via the toner conveyance pipe 197.

A cassette 113 (also referred to as a sheet tray or a storage chamber) serving as a storage portion that accommodates sheets S to be used for image formation is attached to the casing 101A at a position below the scanner unit 104 in such a manner that the cassette 113 can be drawn out. Further, one or more optional sheet feeding apparatuses 130 including an additional cassette 113 may be coupled to a lower portion of the casing 101A.

The intermediate transfer belt 108 is an endless belt that is movable (rotatable) and stretched over a driving roller 109*a*, a stretching roller 109*b*, and a tension roller 110 that rotate about axes parallel to each other. The intermediate transfer belt 108 is moved (rotated or conveyed) in a counterclockwise direction in FIG. 1 by rotation of the driving roller 109*a*. A primary transfer roller 107 serving as a primary transfer member is disposed on the inner peripheral side of the intermediate transfer belt 108 at a position opposing the photosensitive drum 102 with the intermediate transfer belt 108 therebetween. A secondary transfer roller 111 serving as a transfer member (secondary transfer member) is disposed on the outer peripheral side of the intermediate transfer belt 108 at a position opposing the driving roller 109*a* with the intermediate transfer belt 108 therebetween. As a nip portion between the intermediate transfer belt 108 and the secondary transfer roller 111, a secondary transfer portion serving as a transfer portion is formed. The intermediate transfer belt 108, the primary transfer roller 107, and the secondary transfer roller 111 constitute a transfer unit (transfer portion) for transferring a toner image formed on the photosensitive drum 102 serving as an image bearing member onto the sheet S.

A belt cleaner 112 serving as a cleaning portion that cleans the intermediate transfer belt 108 is provided at a position opposing the tension roller 110 with the intermediate transfer belt 108 therebetween. The belt cleaner 112 includes a cleaning member 112*a* such as a blade or a brush provided in contact with the intermediate transfer belt 108, and a waste toner container 198 serving as a collection container. The belt cleaner 112 removes an attached matter such as transfer residual toner from the intermediate transfer belt 108 by the cleaning member 112*a*, and collects the removed attached matter to the waste toner container 198.

A fixing unit 118 serving as a fixing portion is disposed above the secondary transfer portion in the casing 101A. The fixing unit 118 has a configuration of a thermal fixation system that fixes a toner image by heating. The fixing unit 118 includes a rotary member pair (for example, a roller pair constituted by a fixing roller and a pressurizing roller) that nip and convey the sheet S, and a heat source (for example, a halogen lamp or an induction heating mechanism) that heats the toner image on the sheet S via the fixing roller.

Image Forming Operation

In the case where the printer body 101 executes the image forming operation, the sheet S is fed from the cassette 113 in a lower portion of the casing 101A or the cassette 113 of the sheet feeding apparatus 130 by a feed roller 114 serving as a feeding portion. A separation roller pair 115 conveys the fed sheet S while separating one sheet S from a plurality of sheets S when a plurality of sheets S are fed. This sheet S is conveyed toward a registration roller pair 117 by a pull-out roller 116, and the skew of the sheet S is corrected as a result of the leading end of the sheet S abutting a nip portion of the registration roller pair 117 in a stopped state. The registration roller pair 117 delivers the sheet S into the secondary transfer portion at a timing synchronized with progress of a toner image formation process by the image forming portion 101B.

Meanwhile, the photosensitive drum 102 and the intermediate transfer belt 108 are rotationally driven in the image forming portion 101B. The charging unit 103 uniformly charges the surface of the photosensitive drum 102. The scanner unit 104 draws an electrostatic latent image on the photosensitive drum 102 by irradiating the photosensitive drum 102 with laser light on the basis of image information representing an image to be recorded on the sheet S. This electrostatic latent image is developed (visualized) as a black toner image by being developed by the developing unit 105 by using black toner.

Here, in the case of performing heat-and-pressure bonding described below by the sheet processing apparatus 106, the scanner unit 104 irradiates the photosensitive drum 102 with laser light on the basis of information designating a bonding position on the sheet S, and thus draws an electrostatic latent image on the photosensitive drum 102. This electrostatic latent image is developed by the developing unit 105 by using black toner, and thus a bonding toner image is formed in a region on the photosensitive drum 102 corresponding to a bonding position on the sheet S.

The toner image formed on the photosensitive drum 102 (image bearing member) is transferred (primary transfer) onto the intermediate transfer belt 108 by the primary transfer roller 107, and is conveyed toward the secondary transfer portion by the rotation of the intermediate transfer belt 108. Then, a voltage is applied to the secondary transfer roller 111, and thus the toner image is transferred (secondary transfer) onto the sheet S delivered thereto from the registration roller pair 117. The sheet S having passed through the secondary transfer portion is delivered into the fixing unit 118, the toner image is softened by being heated and pressurized while the sheet S passes through the nip portion between the fixing roller and the pressurizing roller and then adheres to the sheet S, and thus an image is fixed to the sheet S.

The conveyance path for the sheet S having passed through the fixing unit 118 is switched by a switching portion 119. In the case of simplex printing, the sheet S is guided to a discharge path 190 by the switching portion 119, and is discharged from the casing 101A by a discharge roller pair 191. In the present embodiment, the printer body 101 is coupled to the sheet processing apparatus 106 via a relay conveyance unit 192. The sheet S discharged from the discharge roller pair 191 is passed onto the sheet processing apparatus 106 via conveyance roller pairs 193 and 194 of the relay conveyance unit 192. In addition, in the case where the relay conveyance unit 192 and the sheet processing apparatus 106 are not coupled, the discharge roller pairs 191 discharge the sheet S as a product onto a supporting tray 135 provided in an upper portion of the casing 101A.

In the case of duplex printing, the sheet S on a first surface of which an image has been formed is guided to a reverse conveyance roller pair 199 by the switching portion 119. Then, the sheet S is reversed and conveyed (switchback conveyance) by the reverse conveyance roller pair 199, and is then conveyed toward the registration roller pair 117 through a duplex conveyance path 218. The sheet S passes through the secondary transfer portion and the fixing unit 118, thus an image is formed on a second surface of the sheet S opposite to the first surface, and then the sheet S is discharged from the casing 101A by the discharge roller pair 191.

Figure 2:
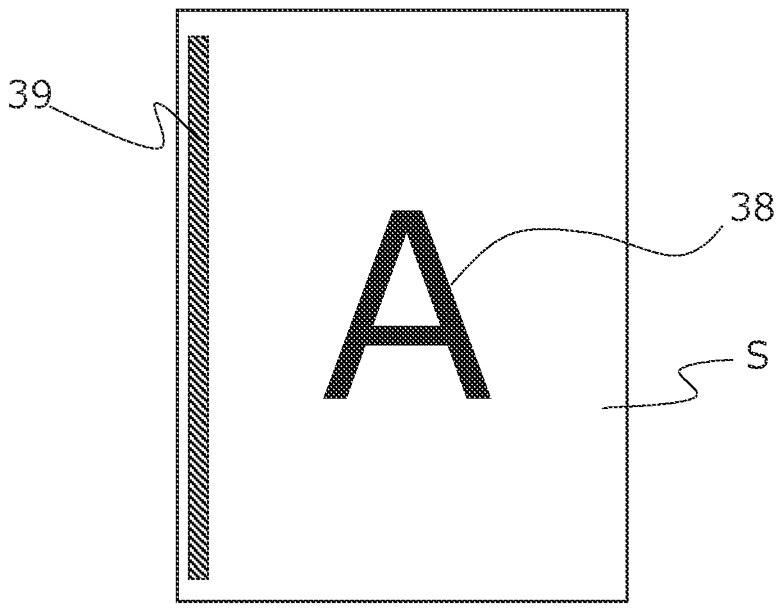
FIG. 2 is a diagram illustrating an example of a toner image formed on a sheet by a printer body according to the first embodiment.

FIG. 2 is a diagram illustrating an example of toner images formed on the sheet S. On the illustrated sheet S, a toner image (recording toner image) 38 for recording an image such as a text, a figure, or a photograph, and a toner image (bonding toner image) 39 for bonding sheets together are formed. The position, shape, width, and the like of the bonding toner image 39 can be changed in accordance with the configuration of a heat-and-pressure bonding portion 167 that will be described later.

To be noted, in the case where the image forming apparatus 100 creates a booklet by simplex printing, the bonding toner image 39 is formed on only one surface (the same surface as the recording toner image) of the sheet S. In the case of a booklet formed by duplex printing, the bonding toner image 39 may be formed on only one surface of the sheet S, or may be formed on both surfaces of the sheet S.

Sheet Processing Apparatus

The sheet processing apparatus 106 includes a buffering portion 120 serving as a buffering portion (stacking portion) in which a plurality of sheets S are stacked, an alignment portion 156 serving as an alignment mechanism that aligns the plurality of sheets S, and a heat-and-pressure bonding portion 167 that performs heat-and-pressure bonding of the sheets S. The heat-and-pressure bonding portion 167 is an example of a sheet bonding apparatus (booklet making apparatus, bonding unit, bonding portion, heat-and-pressure bonding mechanism, or sticking processing portion) that makes a booklet by bonding sheets together. In addition, the sheet processing apparatus 106 includes an upper discharge tray 125 and a lower discharge tray 137 each capable of ascending and descending as a discharge destination to which the product of the image forming apparatus 100 is to be discharged.

The sheet processing apparatus 106 is a sheet processing apparatus that receives the plurality of sheets S that are subjected to image formation by the printer body 101 one by one, performs a bonding process (heat-and-pressure bonding) on the received sheets S, and discharges the sheets S as a sheet bundle (booklet). The buffering portion 120, the alignment portion 156, and the heat-and-pressure bonding portion 167 will be described in detail later. In addition, the sheet processing apparatus 106 can also discharge a sheet S on which an image has been formed by the printer body 101 onto the upper discharge tray 125 or the lower discharge tray 137 without performing the process on the sheet S.

Buffering Portion

Figure 3:
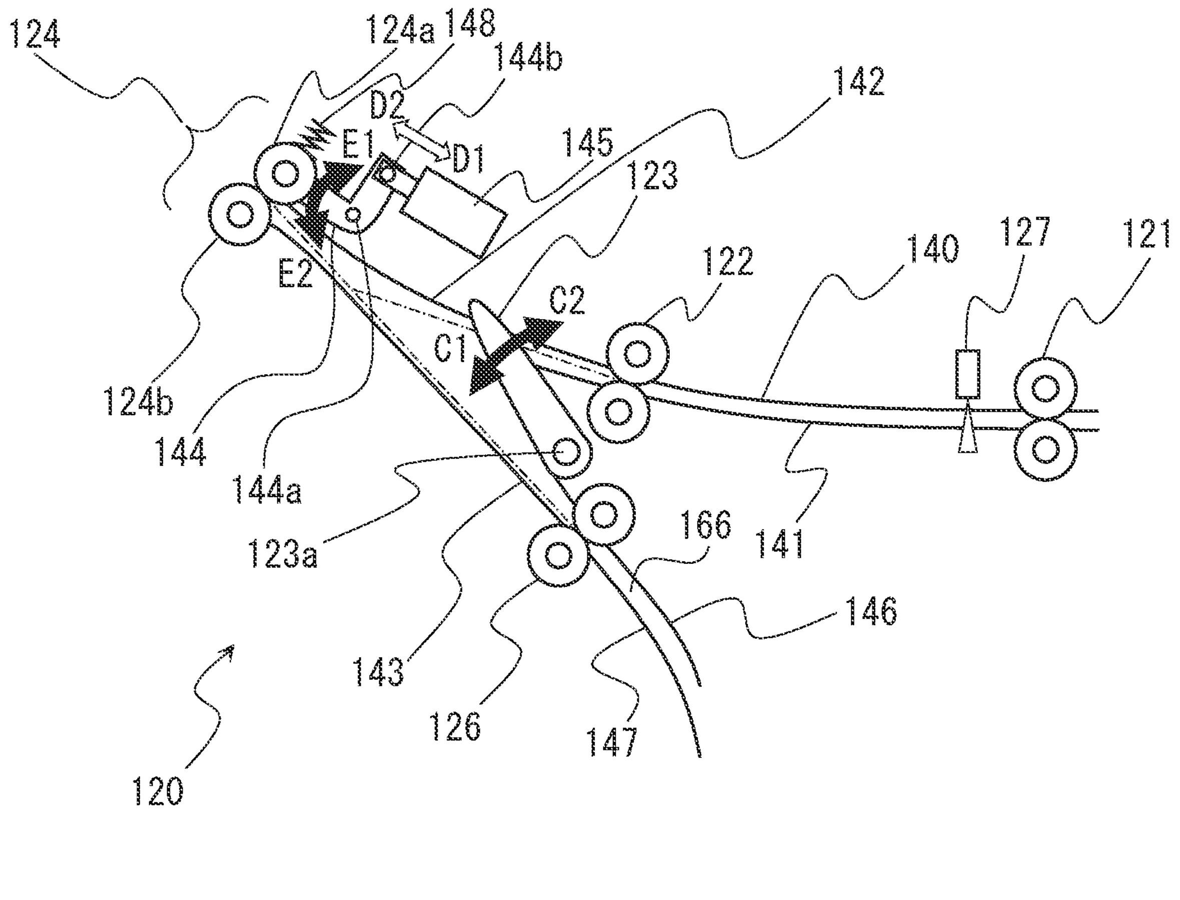
FIG. 3 is a diagram illustrating a buffering portion of a sheet processing apparatus according to the first embodiment.

The buffering portion 120 will be described with reference to FIG. 3. FIG. 3 is an enlarged view of a cross-section of the buffering portion 120. The buffering portion 120 includes an inlet roller pair 121, a pre-buffer roller pair 122, a non-return member 123, a reverse conveyance roller pair 124, and an inner discharge roller pair 126. In addition, the buffering portion 120 includes an inlet sensor 127 that detects the sheet, and a separation mechanism constituted by a plunger solenoid 145 and the like for opening and closing the reverse conveyance roller pair 124 (bringing the reverse conveyance roller pair 124 into and out of contact).

The inlet roller pair 121, the pre-buffer roller pair 122, the reverse conveyance roller pair 124, and the inner discharge roller pair 126 are each a roller pair that nips and conveys a sheet. The inlet roller pair 121 and the pre-buffer roller pair 122 are disposed in a conveyance path (inlet path) for the sheet processing apparatus 106 to receive the sheet S. The reverse conveyance roller pair 124 is disposed in a conveyance path 139 (see FIG. 1) communicating with the upper discharge tray 125. The inner discharge roller pair 126 is disposed in a conveyance path (inner discharge path 166 illustrated in FIG. 1) from the reverse conveyance roller pair 124 toward the heat-and-pressure bonding portion 167. To be noted, the sheet processing apparatus 106 includes a discharge conveyance path 138 (see FIG. 1) from the heat-and-pressure bonding portion 167 toward the lower discharge tray 137.

The inlet path is defined by an upper inlet guide 140 and a lower inlet guide 141. A first discharge path is defined by an upper reverse guide 142 and a lower reverse guide 143. The inner discharge path 166 is defined by an upper inner discharge guide 146 and a lower inner discharge guide 147.

The inlet sensor 127 is disposed to detect the sheet received by the inlet roller pair 121. As the inlet sensor 127, for example, a reflective photosensor that determines presence or absence of the sheet S by emitting infrared light into the inlet path through an opening provided in the upper inlet guide 140 and detecting reflected light from the sheet S can be used. A hole having a diameter equal to or larger than the spot diameter of the infrared light emitted from the inlet sensor 127 may be provided in the lower inlet guide 141 such that the infrared light is not reflected when the sheet is not passing through the inlet path.

The non-return member 123 is a guide member disposed downstream of the pre-buffer roller pair 122 in a sheet conveyance direction in the inlet path. The non-return member 123 is disposed to be rotatable about a rotation shaft 123*a* with respect to the upper inner discharge guide 146. The non-return member 123 is movable to a first position where (backward) movement of the sheet from the first discharge path to the inlet path is suppressed and a second position where movement of the sheet from the inlet path to the first discharge path is allowed. The non-return member 123 is urged in a C2 direction from the second position toward the first position by an unillustrated spring. The non-return member 123 is configured to move in the C1 direction from the first position toward the second position by being pressed by the sheet, and return to the first position after the sheet passes.

As viewed in the rotational axis direction of the non-return member 123, a distal end portion of the non-return member 123 at the first position overlaps with the upper reverse guide 142. In addition, the distal end portion of the non-return member 123 is formed in a comb shape so as to enable the overlap with the upper reverse guide 142. In addition, as viewed in the rotational axis direction of the non-return member 123, a space that the sheet can pass through is defined between the non-return member 123 at the second position and the upper reverse guide 142.

The reverse conveyance roller pair 124 is constituted by an upper reverse conveyance roller 124*a* and a lower reverse conveyance roller 124*b*, and drive is supplied to both of these rollers. The upper reverse conveyance roller 124*a* and the lower reverse conveyance roller 124*b* are configured such that the rotations thereof are always synchronized. In addition, a separation lever 144 is coupled to the upper reverse conveyance roller 124*a*. The separation lever 144 is supported so as to be pivotable about a lever support shaft 144*a* with respect to the upper reverse guide 142. In addition, the separation lever 144 is rotatably coupled to the plunger solenoid 145 via a solenoid coupling shaft 144*b*.

When a current is supplied to the plunger solenoid 145, the core moves in a D1 direction in FIG. 3, and therefore the separation lever 144 pivots in an E1 direction in FIG. 3. In this case, the reverse conveyance roller pair 124 takes a separated state in which the upper reverse conveyance roller 124*a* and the lower reverse conveyance roller 124*b* are separated (state in which the nip portion is open). In addition, in the case where the current flowing in the plunger solenoid 145 is stopped, the upper reverse conveyance roller 124*a* moves in an E2 direction by an urging force of a compression spring 148, and the core of the plunger solenoid 145 moves in a D2 direction. In this case, the reverse conveyance roller pair 124 takes a contact state in which the upper reverse conveyance roller 124*a* and the lower reverse conveyance roller 124*b* are in contact with each other (state in which the nip portion is formed).

Buffering Operation

Next, the operation of the buffering portion 120 will be described. FIGS. 4A to 4H are diagrams illustrating the operation of the buffering portion 120. In the description below, it is assumed that a sheet S1, a sheet S2, and a sheet S3 are conveyed from the printer body 101 to the sheet processing apparatus 106 in this order.

The buffering portion 120 performs a buffering operation (stacking operation) in which a newly conveyed sheet is stacked on a sheet (or a sheet bundle) while the sheet (or the sheet bundle) is reciprocated between the reverse conveyance roller pair 124 and the inner discharge roller pair 126. In the present embodiment, a plurality of sheets that are stacked in the buffering portion 120 and are not bonded and a plurality of sheets as one copy of product having undergone the heat-and-pressure bonding in the heat-and-pressure bonding portion 167 are each referred to as a "sheet bundle", but the former may be referred to as a sheet stack and distinguished from a bonded sheet bundle.

In addition, the sheet processing apparatus 106 increases the sheet conveyance speed in the apparatus. In the description below, the sheet conveyance speed of the inlet roller pair 121 will be denoted by V1, and the sheet conveyance speed of the pre-buffer roller pair 122, the reverse conveyance roller pair 124, and the inner discharge roller pair 126 (sheet conveyance speed after acceleration) will be denoted by V2.

Figure 4A:
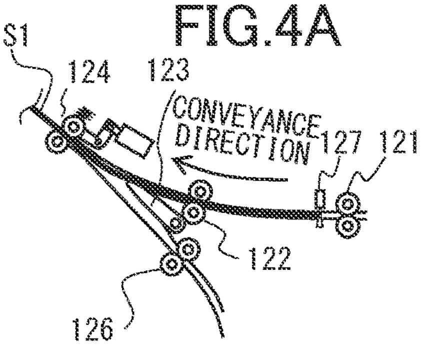
FIGS. 4A to 4H are diagrams illustrating an operation of a buffering portion according to the first embodiment.

As illustrated in FIG. 4A, when the trailing end of a preceding sheet S1 passes the inlet sensor 127, the conveyance speed of the sheet S1 by the pre-buffer roller pair 122 and the reverse conveyance roller pair 124 is increased from V1 to V2. As a result of this, the conveyance interval between the sheet S1 and a succeeding sheet S2 increases, and therefore the reverse conveyance roller pair 124 can switch back the sheet S1 without the sheet S1 colliding with the sheet S2.

Figure 4B:
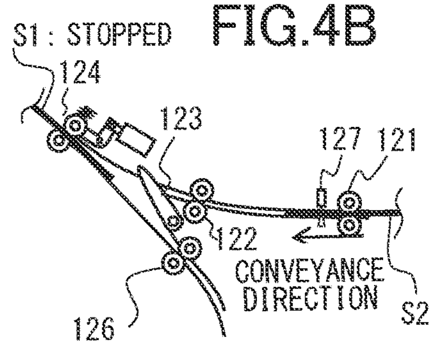

As illustrated in FIG. 4B, when the trailing end of the sheet S1 passes the non-return member 123, the conveyance by the reverse conveyance roller pair 124 is temporarily stopped.

Figure 4C:
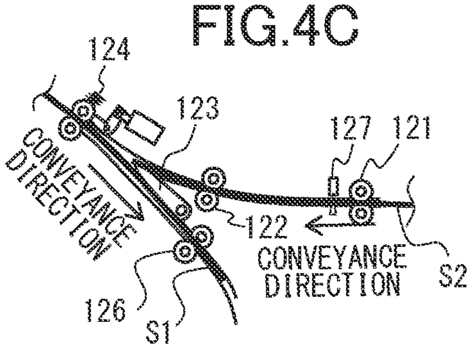

As illustrated in FIG. 4C, the reverse conveyance roller pair 124 changes the rotational direction thereof, and conveys the sheet S1 toward the inner discharge roller pair 126.

Figure 4D:
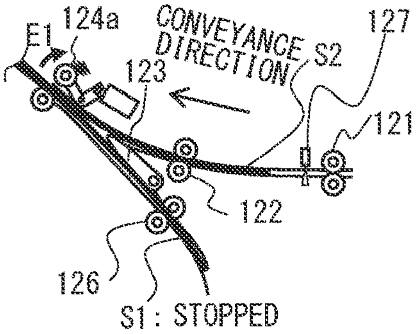

As illustrated in FIG. 4D, the conveyance of the sheet S1 by the reverse conveyance roller pair 124 and the inner discharge roller pair 126 is stopped at a position where the leading end of the sheet S1 has passed the inner discharge roller pair 126 by a predetermined amount. In addition, the upper reverse conveyance roller 124*a* moves in the E1 direction after the sheet S1 is nipped by the inner discharge roller pair 126. As a result of this, the reverse conveyance roller pair 124 is separated, and thus it becomes possible to receive the succeeding sheet S2. After the upper reverse conveyance roller 124*a* is retracted, the succeeding sheet S2 is conveyed to the reverse conveyance roller pair 124.

Figure 4E:
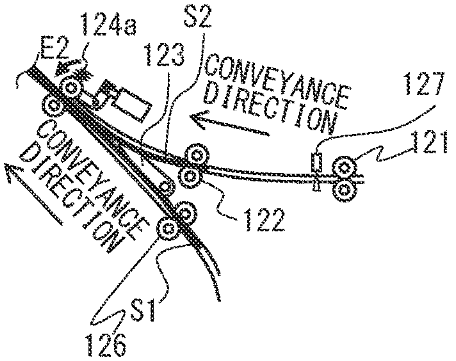

As illustrated in FIG. 4E, when the trailing end of the succeeding sheet S2 passes the inlet sensor 127, the conveyance speed of the sheet S2 is increased from V1 to V2 similarly to the sheet S1. The inner discharge roller pair 126 conveys the sheet S1 toward the reverse conveyance roller pair 124 at a timing at which the sheet S2 reaches a predetermined target position. At a timing at which the speed of the sheet S1 and the speed of the sheet S2 are approximately equal (speed difference is substantially 0), the upper reverse conveyance roller 124*a* moves in the E2 direction, and the reverse conveyance roller pair 124 takes the contact state. At the time of contact, the reverse conveyance roller pair 124 simultaneously nips the sheets S1 and S2. In addition, the speed of the reverse conveyance roller pair 124 is adjusted so as to be equal to the conveyance speed of the sheets S1 and S2 before switching from the separated position to the contact position.

Figure 4F:
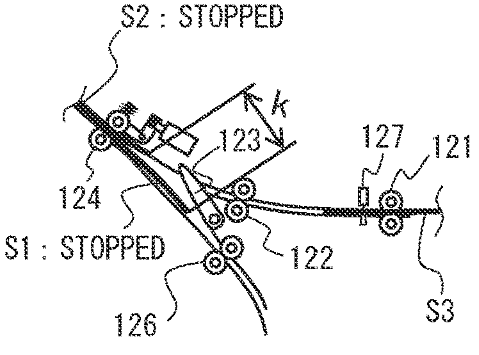

As illustrated in FIG. 4F, after the trailing end of the sheet S2 has passed the non-return member 123, the reverse conveyance roller pair 124 temporarily stops again. Here, the target position described above is set such that the sheet S1 projects more than the sheet S2 by a predetermined amount k in the conveyance direction from the inner discharge roller pair 126 toward the alignment portion 156. In other words, in the sheet bundle stacked in the buffering portion 120, the sheet S1 that is on the lower side in the alignment portion 156 projects downstream in the conveyance direction toward the alignment portion 156 more than the sheet S2 that is on the upper side in the alignment portion 156 by the predetermined amount k.

Figure 4G:
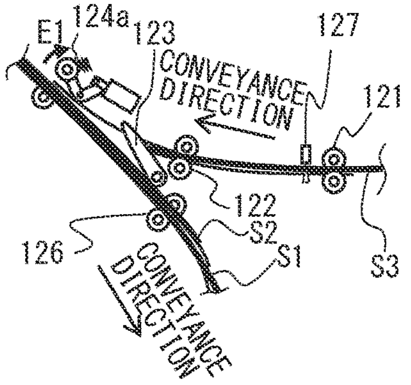

As illustrated in FIG. 4G, the reverse conveyance roller pair 124 changes the rotational direction thereof, and conveys the sheets S1 and S2 toward the inner discharge roller pair 126. The sheets S1 and S2 are conveyed toward the alignment portion 156 by the inner discharge roller pair 126. The upper reverse conveyance roller 124*a* moves in the E1 direction after the sheet S1 is nipped by the inner discharge roller pair 126. As a result of this, the reverse conveyance roller pair 124 is separated, and thus it becomes possible to receive the succeeding sheet S3.

Figure 4H:
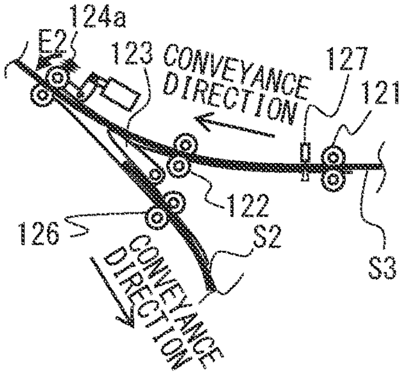

As illustrated in FIG. 4H, after the trailing end of the sheet S2 has passed the reverse conveyance roller pair 124, the upper reverse conveyance roller 124*a* moves in the E2 direction. As a result of this, the reverse conveyance roller pair 124 takes the contact state, and nips and conveys the sheet S3.

By repeatedly performing the buffering operation described above, the buffering portion 120 can deliver a stack of a predetermined number of sheets to the alignment portion 156. In addition, although a buffering operation of stacking two sheets has been described as an example, the sheet S3 can be further stacked on the sheets S1 and S2 by temporarily stopping the conveyance of the sheets S1 and S2 in the state of FIG. 4G and then conveying the sheets S1 and S2 in a reverse direction. That is, the buffering portion 120 can create a sheet bundle in which three or more (for example, five) sheets are stacked by repeating the operation of FIGS. 4D to 4G.

To be noted, the target position for the stacking of sheets is determined on the basis of the timing at which the trailing end of the sheet is detected by the inlet sensor 127. Therefore, the sheets can be stacked in a state of being displaced from each other by predetermined amounts by the buffering operation of the present embodiment even if the length of the sheet in the conveyance direction changes.

As illustrated in FIG. 1, the sheet bundle stacked in the buffering portion 120 is conveyed from the inner discharge roller pair 126 to an intermediate conveyance roller pair 128, an inlet conveyance path 165, and then a kick-out roller pair 129. Then, the sheet bundle is conveyed by the kick-out roller pair 129 to the alignment portion 156 (intermediate supporting portion or processing stage) constituted by an upper intermediate guide 151, a lower intermediate guide 152, and the like. In addition, a pressing flag 150 that suppresses lifting of the trailing end of a sheet that has been already stacked, such that the trailing end of the sheet that has been already stacked in the alignment portion 156 and the leading end of the succeeding sheet conveyed to the alignment portion 156 do not interfere with each other, is disposed downstream of the kick-out roller pair 129.

Alignment Portion

Figure 5:
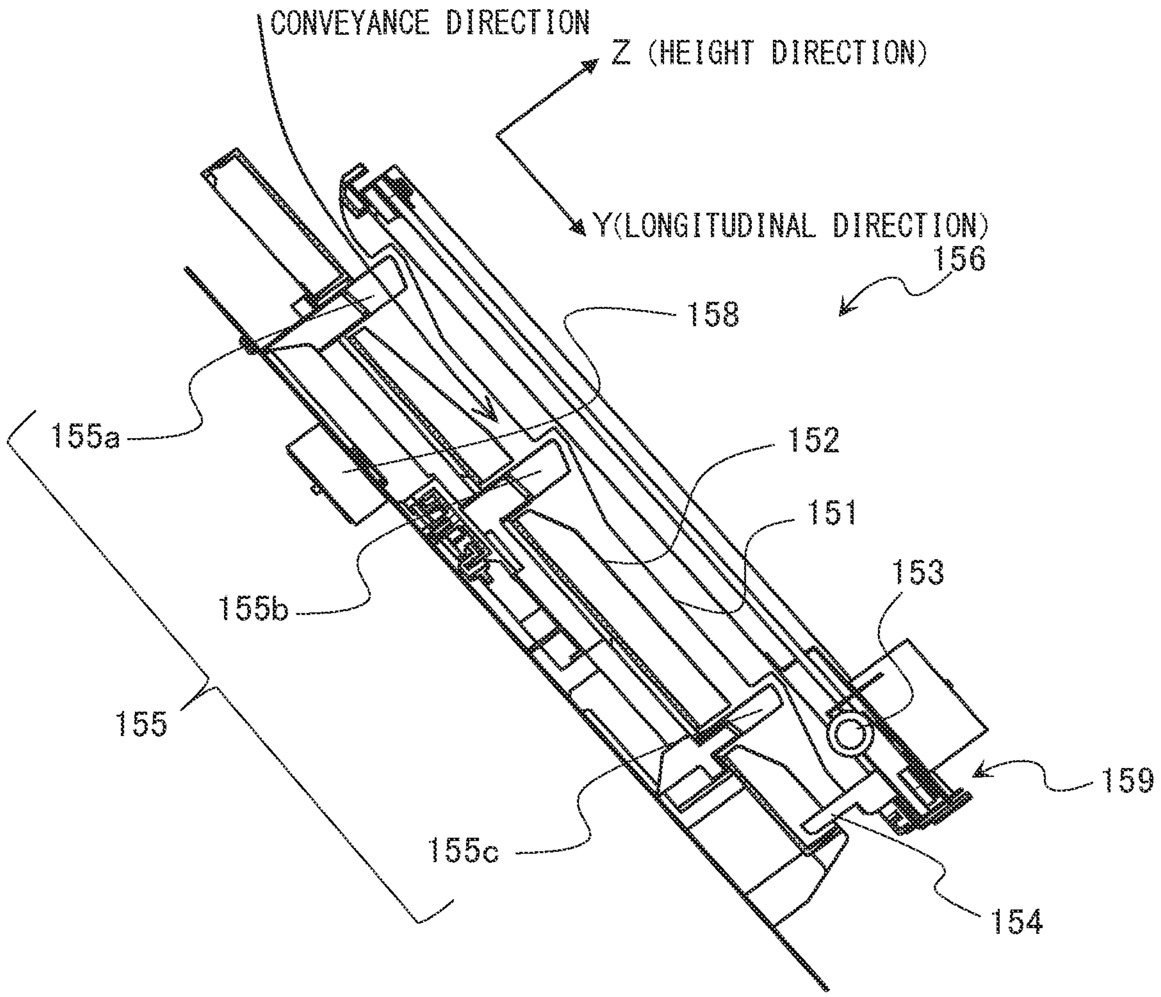
FIG. 5 is a diagram illustrating an alignment portion of the sheet processing apparatus according to the first embodiment.
Figure 6:
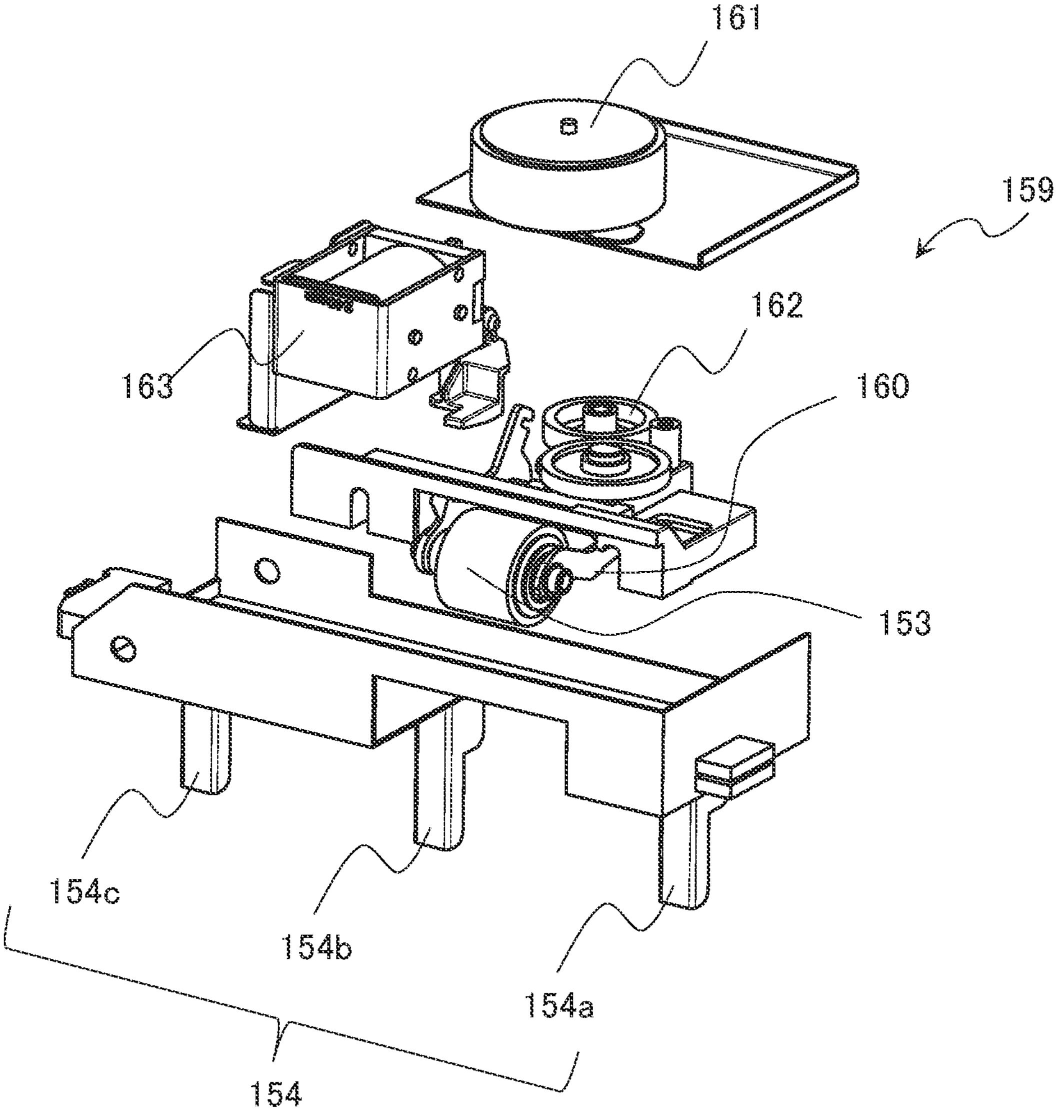
FIG. 6 is a diagram illustrating a movable unit of the alignment portion according to the first embodiment.

Next, the configuration of the alignment portion 156 will be described with reference to FIGS. 5 and 6. FIG. 5 is a section view of the alignment portion 156. FIG. 6 is a diagram illustrating constituent elements of a movable unit 159 in an exploded state.

In the description and drawings below, a direction in which the pressurizing member of the heat-and-pressure bonding portion 167 moves with respect to the receiving member to pressurize a sheet will be referred to as a Z direction. The Z direction is a height direction (thickness direction) of the sheets stacked in the alignment portion 156. In addition, directions orthogonal to each other in a virtual plane orthogonal to the Z direction will be referred to as an X direction and a Y direction. If necessary, directions of arrows X, Y, and Z illustrated in each drawing will be respectively expressed as a +X direction, a +Y direction, and a +Z direction, and directions opposite thereto will be respectively expressed as a −X direction, a −Y direction, and a −Z direction.

In the present embodiment, the Y direction is substantially parallel to the conveyance direction in which the sheet is conveyed to the alignment portion 156 by the kick-out roller pair 129. In addition, in the present embodiment, the X direction is a sheet width direction orthogonal to the conveyance direction. In the description below, the Y direction may be sometimes referred to as a "longitudinal direction", and the X direction may be sometimes referred to as a "sheet width direction" or a "lateral direction".

The alignment portion 156 includes a lower intermediate guide 152 serving as a supporting portion that supports sheets, an upper intermediate guide 151 opposing the lower intermediate guide 152, and the movable unit 159 including a longitudinal alignment standard plate 154 and a longitudinal alignment roller 153.

As illustrated in FIG. 6, the longitudinal alignment standard plate 154 includes sheet abutting portions 154*a*, 154*b*, and 154*c* arranged in the sheet width direction. The sheet abutting portions 154*a*, 154*b*, and 154*c* serve as standard positions for sheet alignment in the sheet conveyance direction (Y direction). The longitudinal alignment roller 153 is rotatably held by a roller holder 160. The roller holder 160 is capable of swinging by a driving force of a solenoid 163. As a result of the swing of the roller holder 160, the longitudinal alignment roller 153 is movable to a position where the longitudinal alignment roller 153 abuts the sheet S on the lower intermediate guide 152 and a position where the longitudinal alignment roller 153 is retracted upward from the sheet S.

In addition, a driving motor 161 is attached to the movable unit 159. As a result of the driving force of the driving motor 161 being transmitted via a gear train 162, the longitudinal alignment roller 153 rotates. The movable unit

159 is movable as an integral unit in the sheet conveyance direction (Y direction) with respect to the lower intermediate guide 152.

Figure 7A:
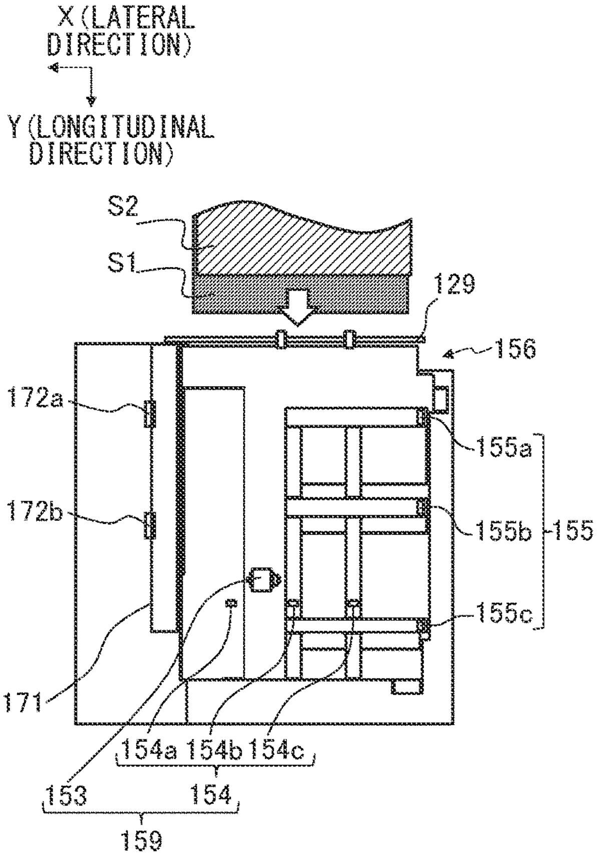
FIGS. 7A to 7D are diagrams illustrating an operation of the alignment portion according to the first embodiment.

As illustrated in FIG. 5, the alignment portion 156 includes a width alignment member 155, a driving motor 158, and width alignment standard plates 172*a* and 172*b* illustrated in FIG. 7A. The width alignment member 155 is movable in the sheet width direction (X direction) by the driving force of the driving motor 158. The width alignment member 155 includes a plurality of sheet pressing portions 155*a*, 155*b*, and 155*c* arranged in the sheet conveyance direction. As illustrated in FIG. 7A, the width alignment standard plates 172*a* and 172*b* are a plurality of plate-like members (sheet abutting portions) arranged in the sheet conveyance direction. The width alignment standard plates 172*a* and 172*b* serve as standard positions for sheet alignment in the sheet width direction (X direction).

Alignment Operation

The operation of the alignment portion 156 will be described with reference to FIGS. 7A to 7D. FIGS. 7A to 7D are each a schematic view of the alignment portion 156 as viewed from above in the Z direction. Illustration of elements related to driving of the upper intermediate guide 151 and the heat-and-pressure bonding portion 167 is omitted.

In the case of aligning sheets in the alignment portion 156, the movable unit 159 is positioned at a predetermined standby position in the sheet conveyance direction (Y direction) in advance in accordance with the sheet size, and conveyance of the sheet is waited for. The standby position is a position where the distance from the nip position of the kick-out roller pair 129 to the sheet abutting portions 154*a* to 154*c* of the longitudinal alignment standard plate 154 in the Y direction is slightly larger than the length of the sheet.

The operation of the alignment portion 156 will be described below by taking a case where a sheet bundle constituted by five sheets S1 to S5 stacked in the buffering portion 120 is conveyed as an example. To be noted, the number of sheets in the sheet bundle stacked in the buffering portion 120 can be changed.

FIG. 7A illustrates a state in which the first sheet S1 and the second sheet S2 are about to be conveyed toward the alignment portion 156. The movable unit 159 (the longitudinal alignment standard plate 154 and the longitudinal alignment roller 153) has completed movement to the standby position corresponding to the sheet size. The width alignment member 155 stands by at a position slightly outward from a side end position of the sheet bundle so as not to interrupt the conveyance of the sheet bundle.

Figure 7B:
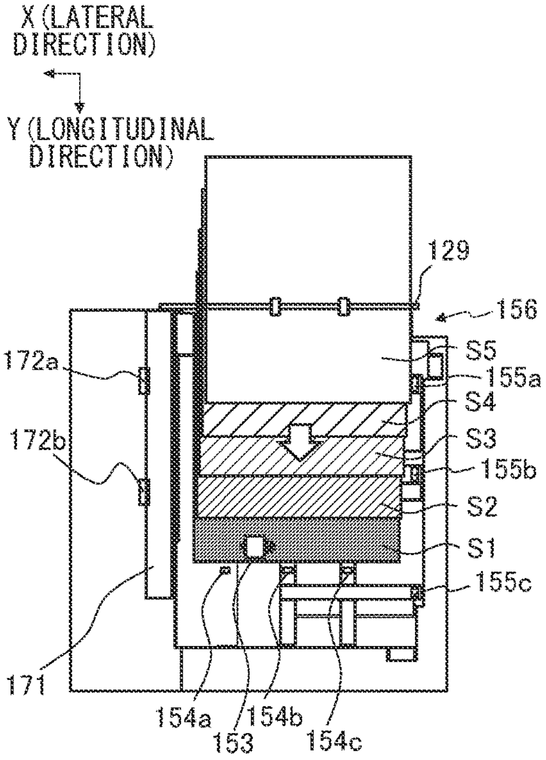

FIG. 7B illustrates a state in which the trailing end of the first sheet S1 has been released from the nip of the kick-out roller pair 129 and the leading end of the sheet S1 has reached the longitudinal alignment roller 153. The longitudinal alignment roller 153 has moved down to a contact position in advance in response to power supply to the solenoid 163, and is rotated by a driving motor 161.

The sheet S1 is aligned in the sheet conveyance direction by being conveyed in the +Y direction by the longitudinal alignment roller 153 and caused to abut the longitudinal alignment standard plate 154. Then, each time the succeeding sheets S2 to S5 are released from the kick-out roller pair 129, each sheet is conveyed in the +Y direction by the longitudinal alignment roller 153 and caused to abut the longitudinal alignment standard plate 154, and is thus aligned in the sheet conveyance direction.

Figure 7C:
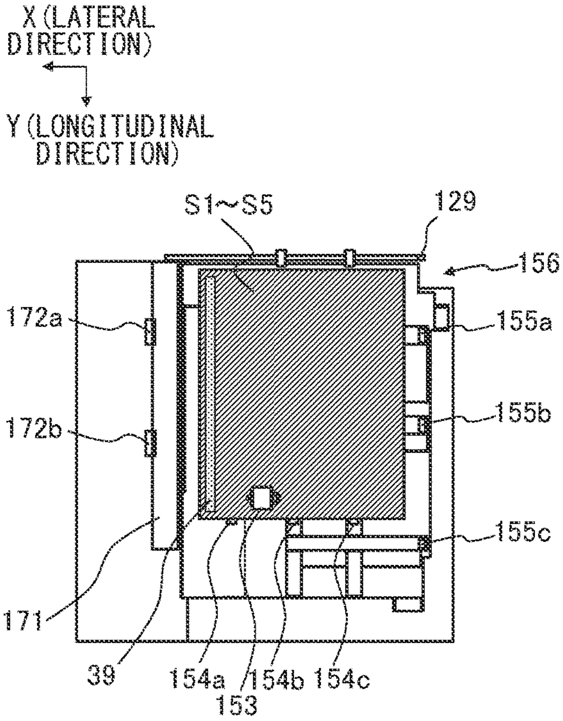

FIG. 7C illustrates a state in which the five sheets S1 to S5 are each caused to abut the longitudinal alignment standard plate 154 and alignment in the sheet conveyance direction is completed. In this state, the width alignment member 155 is moved in the sheet width direction (X direction) by the driving force of the driving motor 158 illustrated in FIG. 5). One side end of the sheets S1 to S5 is pressed by the sheet pressing portions 155*a*, 155*b*, and 155*c* of the width alignment member 155, and thus the sheets S1 to S5 move toward the width alignment standard plates 172*a* and 172*b*.

Figure 7D:
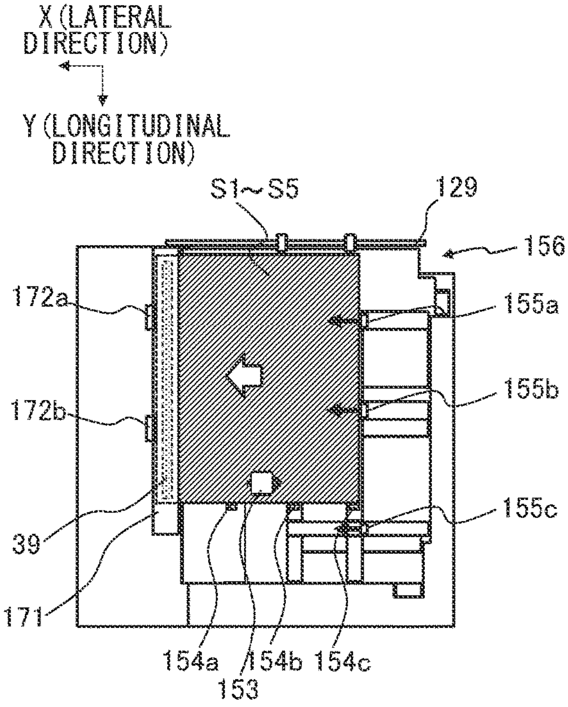

FIG. 7D illustrates a state in which side ends of the sheets S1 to S5 are respectively caused to abut the width alignment standard plates 172*a* and 172*b*. As a result of this, the sheets S1 to S5 are aligned in the sheet width direction. After this, heat-and-pressure bonding of the five sheets S1 to S5 is performed by the heat-and-pressure bonding portion 167 that will be described later. In addition, in the case of creating a booklet constituted by six or more sheets, the alignment portion 156 is prepared to receive the sixth and later sheets in parallel with the heat-and-pressure bonding of the sheets S1 to S5. Specifically, the width alignment member 155 is moved in a retracting direction (−X direction).

Heat-and-Pressure Bonding Portion

Figure 8:
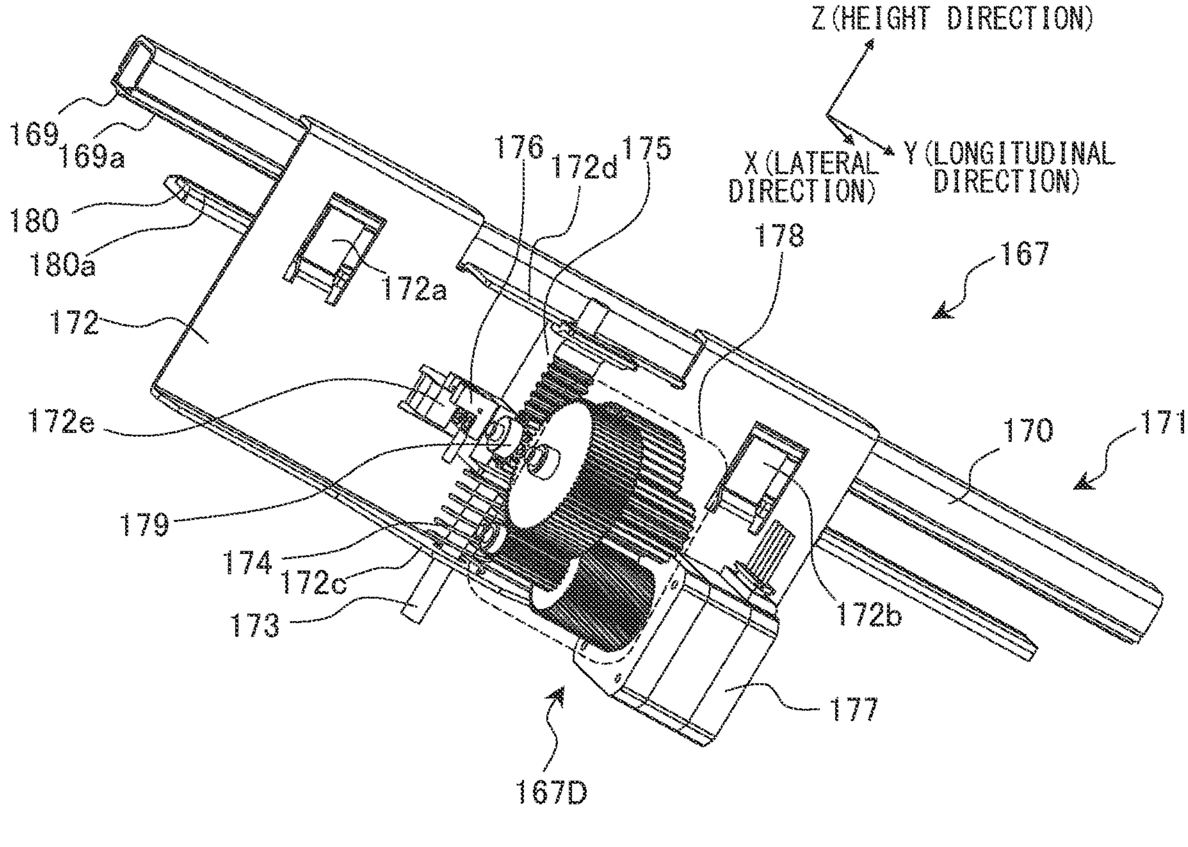
FIG. 8 is a diagram illustrating a heat-and-pressure bonding portion according to the first embodiment.

The configuration of the heat-and-pressure bonding portion 167 according to the present embodiment will be described with reference to FIG. 8. FIG. 8 is a perspective view of the heat-and-pressure bonding portion 167.

Figures 9A, 9B, 9C, 9D, 9E, 9F:
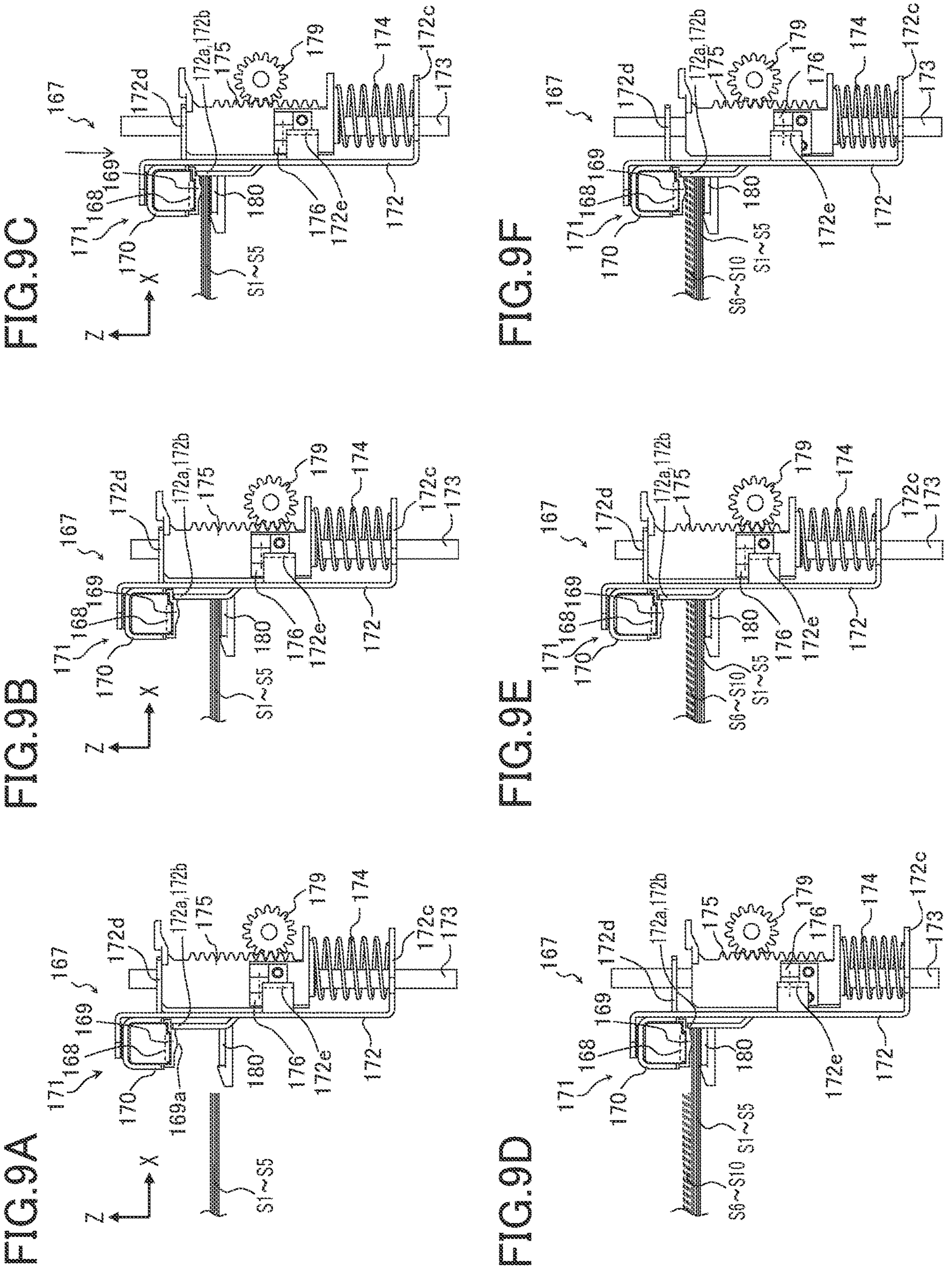
FIGS. 9A to 9F are diagrams illustrating an operation of the heat-and-pressure bonding portion according to the first embodiment.

The heat-and-pressure bonding portion 167 is an example of a sheet bonding apparatus (booklet making apparatus, bonding unit, bonding portion, heat-and-pressure bonding mechanism, or sticking processing portion) that bonds sheets together. As illustrated in FIG. 8, the heat-and-pressure bonding portion 167 includes a pressurizing unit 171 including a pressurizing plate 169, a receiving plate 180 opposing the pressurizing plate 169, a heater 168 illustrated in FIG. 9A provided in the pressurizing unit 171, and a driving system 167D that drives the pressurizing unit 171. The driving system 167D includes a motor 177 serving as a drive source, a gear train 178, a pinion gear 179, and a rack gear 175. In addition, the heat-and-pressure bonding portion 167 includes a compression spring 174 provided between the rack gear 175 and the pressurizing unit 171.

The pressurizing plate 169 is an example of a pressurizing member (first pressurizing member), and the pressurizing unit 171 is an example of a pressurizing portion. The receiving plate 180 is an example of a receiving member (second pressurizing member) opposing the pressurizing member. The rack gear 175 is an example of a moving portion that moves the pressurizing member (pressurizing unit). The heater 168 is an example of a heating portion that heats the sheet bundle. The compression spring 174 is an example of an elastic member provided between the pressurizing member and the moving portion.

The receiving plate 180 is formed from an elastic material (elastomer), for example, silicone rubber. The receiving plate 180 is fixed to a frame body of the heat-and-pressure bonding portion 167, and receives the pressurizing force of the pressurizing unit 171. The receiving plate 180 has a plate shape elongated in the Y direction and having the Z direction as the thickness direction. The receiving plate 180 has a contact surface 180*a* that comes into contact with the lower surface of the sheet. The contact surface 180*a* of the present embodiment is a flat (flush) surface spreading substantially orthogonally with respect to the Z direction. In the present embodiment, an example in which the sheet bundle is pressurized by the pressurizing plate 169 (first pressurizing member) moving toward the receiving plate 180 (second pressurizing member) during heat-and-pressure bonding will be described. To be noted, the sheet bundle may be pressurized by the first pressurizing member and the second pressurizing member moving closer to each other.

The pressurizing unit 171 includes the pressurizing plate 169, a metal stay 170, and a lift plate 172. In addition, the heater 168 of the present embodiment is provided in the pressurizing unit 171. The pressurizing plate 169, the heater 168, and the metal stay 170 serve as a heater portion (heater unit) held by the lift plate 172 serving as a holding member.

The pressurizing plate 169 has a plate shape elongated in the Y direction and having the Z direction as the thickness direction. The pressurizing plate 169 is formed from, for example, aluminum. The heat-and-pressure bonding portion 167 can perform heat-and-pressure bonding of the sheet bundle stacked in the alignment portion 156 along one side extending in the Y direction, by using the pressurizing plate 169. The alignment portion 156 and the heat-and-pressure bonding portion 167 of the present embodiment can perform so-called long-side binding in which sheets of, for example, the A4 size are aligned in a direction in which the long side thereof is parallel to the sheet conveyance direction (long-side feeding direction) and subjected to heat-and-pressure bonding in a bonding region illustrated in FIG. 2 extending along the long side. To be noted, a binding method other than the long-side binding may be performed by changing the shapes of the pressurizing plate 169 and the receiving plate 180, the position of the heat-and-pressure bonding portion 167, and the like.

The pressurizing plate 169 has a contact surface 169*a* that comes into contact with the upper surface of the sheet. The contact surface 169*a* of the present embodiment includes a ridge portion that is a protruding shape illustrated in FIG. 9A whose center portion in the X direction protrudes more in the pressurizing direction (−Z direction) than end portions thereof in the X direction and extending in the Y direction. By providing the protruding shape (ridge portion) on the pressurizing plate 169, the pressurizing plate 169 can apply more consistent pressurizing force regardless of the part tolerance, assembly tolerance, and the like.

As the heater 168 illustrated in FIG. 9A, a ceramic heater in which a pattern of a heat-generating resistor is formed on a ceramic substrate can be used. The heater 168 is disposed to be in contact with the back surface of the pressurizing plate 169 (surface on the back side of the surface of the pressurizing plate 169 opposing the receiving plate 180). The pressurizing plate 169 and the heater 168 are held by the metal stay 170. The metal stay 170 is fastened to the lift plate 172. The lift plate 172 integrally moves with the heater portion of the pressurizing unit 171. To be noted, in the present embodiment, the width alignment standard plates 172*a* and 172*b* described above are integrally formed with the lift plate 172 by bending part of a metal plate member constituting the lift plate 172. The width alignment standard plates 172*a* and 172*b* may be formed as members separate from the lift plate 172.

The pressurizing unit 171 is capable of moving to a pressurizing position (position during heat-and-pressure bonding illustrated in FIGS. 9C and 9F) where the pressurizing plate 169 pressurizes the sheet bundle, and a retracted position (standby position illustrated in FIG. 9A) in which the pressurizing plate 169 is retracted (separated) in the Z direction from the upper surface of the sheet bundle. The pressurizing position of the pressurizing unit 171 can change in accordance with the thickness of the sheet bundle between the pressurizing plate 169 and the receiving plate 180.

Figure 17:
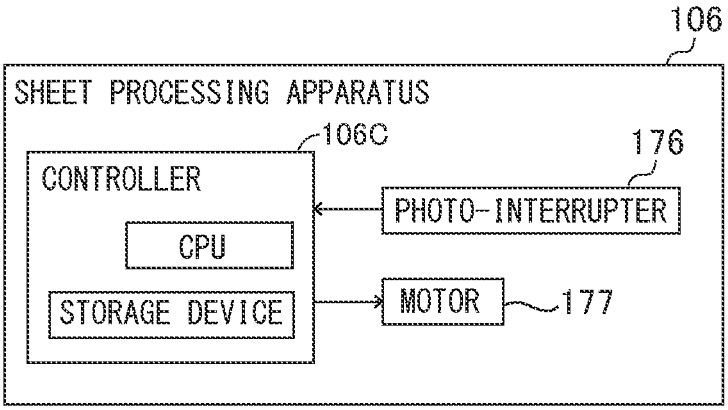
FIG. 17 is a block diagram illustrating a control configuration of the image forming apparatus according to the first embodiment.

In addition, a temperature detection element such as a thermistor is disposed in the pressurizing unit 171 as a temperature detection portion that detects the temperature of the heater 168. A controller 106C of the sheet processing apparatus 106 illustrated in FIG. 17 is capable of controlling the surface temperature of the pressurizing plate 169 to a predetermined temperature suitable for heat-and-pressure bonding by controlling power supply to the heater 168 on the basis of a detection signal of the temperature detection element.

The gear train 178, the pinion gear 179, and the rack gear 175 of the driving system 167D are examples of a drive transmission mechanism that transmits the driving force to the pressurizing unit 171 while converting the rotation of the motor 177 to a force in the movement direction (Z direction) of the pressurizing unit 171.

The pinion gear 179 is coupled to the motor 177 via the gear train 178. The pinion gear 179 is engaged with the rack gear 175. The gear train 178, the pinion gear 179, and the rack gear 175 constitute a reduction mechanism for obtaining a pressurizing force required for the heat-and-pressure bonding of the sheets. To be noted, as the reduction mechanism, for example, a worm gear or a planetary gear mechanism may be used.

The rack gear 175 is guided by a guide shaft 173 having a columnar shape extending in the Z direction, and is capable of reciprocating in the Z direction. The guide shaft 173 is a guide member that guides the movement direction of the rack gear 175 and the pressurizing unit 171. The guide shaft 173 is fixed to the frame body of the heat-and-pressure bonding portion 167. The rack gear 175 moves in the Z direction as a result of the driving force of the motor 177 being transmitted thereto via the gear train 178 and the pinion gear 179. The rack gear 175 is capable of relatively moving in the Z direction with respect to the pressurizing unit 171.

The compression spring 174 is disposed between the rack gear 175 and a lower surface portion 172*c* of the lift plate 172. An end portion of the compression spring 174 on the +Z side is supported by a lower surface of the rack gear 175, and an end portion of the compression spring 174 on the −Z side is supported by the lower surface portion 172*c* of the lift plate 172. In other words, one end of the elastic member of the present embodiment is connected with the rack gear 175 serving as a moving portion, and the other end of the elastic member is connected with the pressurizing unit 171. By disposing the compression spring 174 around the guide shaft 173 guiding the rack gear 175 and the pressurizing unit 171, the layout of the apparatus can be made more compact.

In the case where the heat-and-pressure bonding portion 167 does not perform heat-and-pressure bonding of the sheet bundle, the rack gear 175 is caused to abut an upper surface portion 172*d* of the lift plate 172 by an urging force in the +Z direction received from the compression spring 174. In this case, the pressurizing unit 171 is positioned at the retracted position.

In the case where the heat-and-pressure bonding portion 167 performs heat-and-pressure bonding of the sheets, the rack gear 175 moves in the pressurizing direction (−Z direction) by the driving force transmitted thereto from the motor 177. As a result of this, the pressurizing unit 171 moves in the pressurizing direction (−Z direction), and the pressurizing plate 169 comes into contact with the upper surface of the sheet bundle. As a result of the rack gear 175 moves further in the pressurizing direction (−Z direction) after the pressurizing plate 169 has come into contact with the upper surface of the sheet bundle, the pressurizing plate 169 pressurizes the sheet bundle. When the heat-and-pressure bonding portion 167 performs heat-and-pressure bonding of the sheet bundle, the compression spring 174 is elastically deformed by the driving force of the motor 177, and the pressurizing plate 169 and the receiving plate 180 pressurize the sheet bundle by the restoration force (elastic force) of the compression spring 174.

In addition, the heat-and-pressure bonding portion 167 of the present embodiment is provided with a photo-interrupter 176 capable of detecting change in the positional relationship between the rack gear 175 and the pressurizing unit 171. The photo-interrupter 176 is an example of a detection portion that detects contact of the pressurizing plate 169 with the sheet bundle.

The photo-interrupter 176 is held by the rack gear 175, and is configured to move integrally with the rack gear 175. The lift plate 172 is provided with a rib 172*e* serving as a detected portion to be detected by the photo-interrupter 176. The photo-interrupter 176 includes a light-emitting element that emits light, and a light-receiving element that opposes the light-emitting element and outputs a signal corresponding to a light reception amount, and the signal value changes in accordance with whether or not the rib 172*e* blocks an optical path from the light-emitting element to the light-receiving element.

The photo-interrupter 176 is an example of a sensor (photoelectric sensor) capable of detecting the detected portion (rib 172*e*) by using light. To be noted, the photo-interrupter 176 may be provided on the lift plate 172, and the detected portion may be provided on the rack gear 175. That is, a sensor may be provided on one of the pressurizing member and the moving portion, and a detected portion may be provided on another of the pressurizing member and the moving portion.

The controller 106C illustrated in FIG. 17 can detect the change in the positional relationship between the rack gear 175 and the pressurizing unit 171 on the basis of the signal value output from the photo-interrupter 176. For example, in the present embodiment, the signal value of the photo-interrupter 176 is set to be ON indicating a light-transmitting state in which light is not blocked by the rib 172*e*, when the heat-and-pressure bonding portion 167 does not perform heat-and-pressure bonding of the sheets (i.e., when the pressurizing unit 171 is positioned at the retracted position). In addition, in the present embodiment, the signal value of the photo-interrupter 176 is set to change from ON to OFF when the rack gear 175 starts relatively moving with respect to the pressurizing unit 171 for the heat-and-pressure bonding portion 167 to perform heat-and-pressure bonding of the sheets. As will be described later, the controller 106C of the present embodiment can control the driving amount of the motor 177 on the basis of a detection result of the photo-interrupter 176, and thus can control the pressurizing fore to be applied to the sheet bundle during heat-and-pressure bonding to a desired value.

Here, the position of the rack gear 175 in the case of retracting the pressurizing plate 169 from the sheet bundle as illustrated in FIGS. 9A and 9B will be referred to as a first position. The position of the rack gear 175 where the pressurizing plate 169 has been moved from the position retracted from the sheet bundle toward the receiving plate 180 and has come into contact with the sheet bundle as illustrated in FIG. 9C will be referred to as a second position. The position of the rack gear 175 while the pressurizing plate 169 and the receiving plate 180 are pressurizing the sheet bundle as illustrated in FIG. 9D will be referred to as a third position.

The deformation amount of the compression spring 174 is constant while the rack gear 175 moves from the first position to the second position. In addition, in the case where the rack gear 175 moves from the second position to the third position, the deformation amount of the compression spring 174 increases in accordance with the movement amount from the second position, and the pressurizing plate 169 and the receiving plate 180 pressurize the sheet bundle by the restoration force of the compression spring 174. That is, the present embodiment is configured such that the deformation amount of the elastic member is constant while the moving portion moves from the first position to the second position. In addition, the present embodiment is configured such that in the case where the moving portion moves from the second position to the third position, the deformation amount of the elastic member increases in accordance with the movement amount of the moving portion from the second position, and the pressurizing member and the receiving member pressurize the sheet bundle by the restoration force of the elastic member.

As described above, in the present embodiment, a configuration in which the deformation amount of the compression spring 174 changes in accordance with the movement amount of the pressurizing unit 171 after the pressurizing plate 169 has come into contact with the sheet bundle is employed. According to this configuration, even if the thickness of the sheet bundle to be subjected to bonding changes, the sheet bundle is pressurized by the pressurizing plate 169 and the receiving plate 180 by the restoration force of the compression spring 174 corresponding to the movement amount of the pressurizing unit 171 from the time point at which the pressurizing plate 169 comes into contact with the sheet bundle. Therefore, more consistent pressurizing force can be applied to the sheet bundle than a configuration in which the deformation amount of the compression spring 174 at the time when the pressurizing plate 169 comes into contact with the sheet bundle changes in accordance with the thickness of the sheet bundle.

That is, according to the present embodiment, a sheet bonding apparatus (booklet making apparatus) and an image forming apparatus capable of adjusting the pressurizing force for bonding sheets together to a desired value can be provided. In addition, according to the present embodiment, a sheet bonding apparatus (booklet making apparatus) and an image forming apparatus capable of reducing fluctuation of the pressurizing force for bonding sheets together depending on the thickness of the sheet bundle can be provided.

Operation of Heat-and-Pressure Bonding Portion

Figure 18:
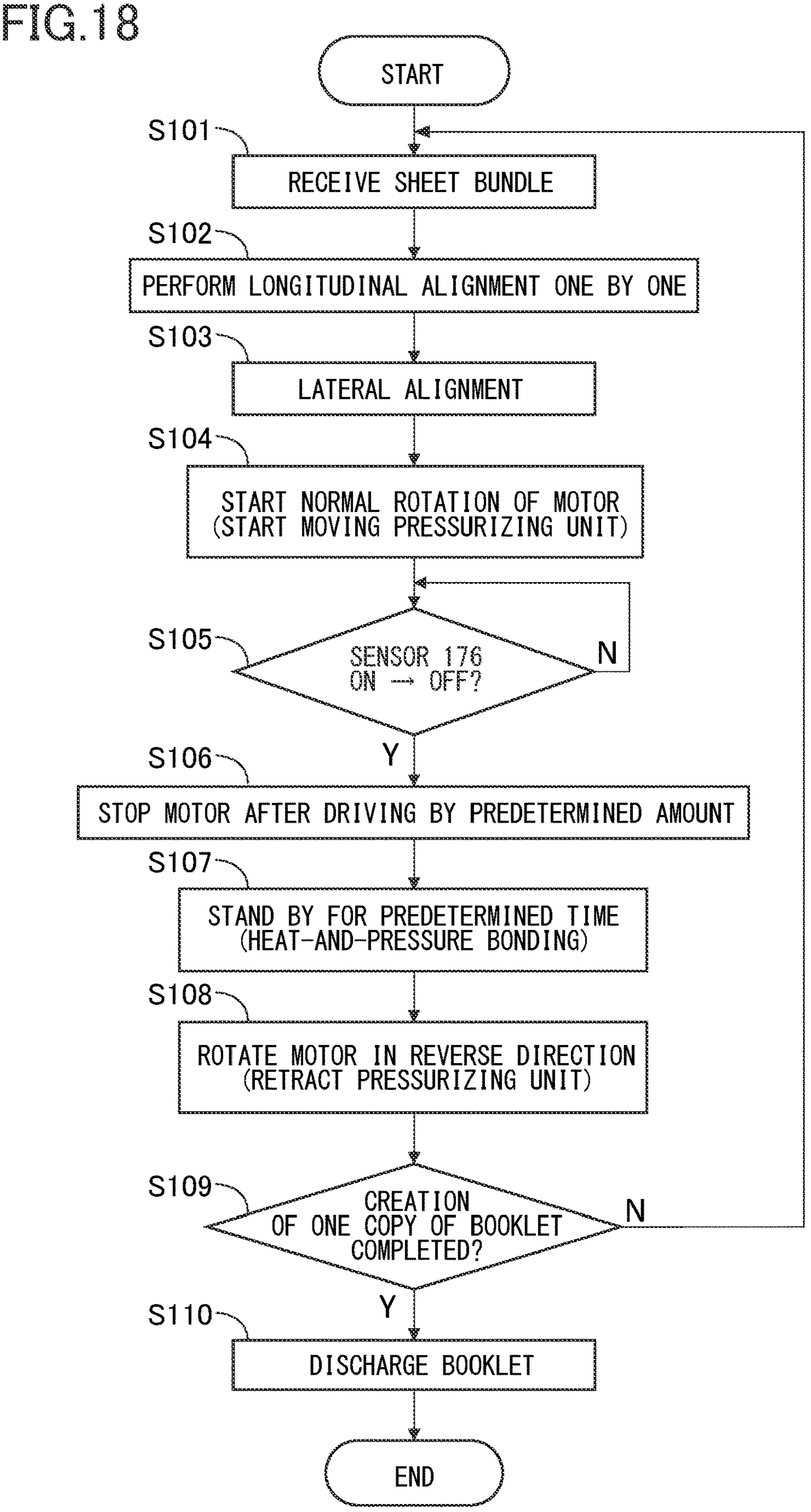
FIG. 18 is a flowchart illustrating a control example of a sheet processing apparatus according to the first and second embodiments.

The heat-and-pressure bonding operation of the heat-and-pressure bonding portion 167 will be described with reference to FIGS. 9A to 9F, 17, and 18. FIGS. 9A to 9F are each a diagram illustrating the heat-and-pressure bonding portion 167 as viewed in the sheet conveyance direction (Y direction). FIG. 17 is a block diagram illustrating a control configuration of the image forming apparatus 100. FIG. 18 is a flowchart illustrating a control example of the sheet processing apparatus 106 in the first embodiment.

As illustrated in FIG. 17, the sheet processing apparatus 106 includes the controller 106C. The controller 106C includes a central processing unit: CPU that executes a program, and a storage device such as a read-only memory: ROM that stores the program and data. The CPU reads out the program from the storage device and executes the program. The CPU controls the operation of each portion of the sheet processing apparatus 106 including the heat-and-pressure bonding portion 167 by driving various actuators on the basis of information obtained in various sensors and information obtained from a controller of the printer body 101. For example, the controller 106C controls the movement amount of the pressurizing unit 171 during the heat-and-pressure bonding by controlling the driving of the motor 177 on the basis of the detection signal of the photo-interrupter 176. The controller 106C is an example of a controller that controls the operation of the heat-and-pressure bonding portion 167 serving as a sheet bonding apparatus (booklet making apparatus).

To be noted, the controller 106C of the sheet processing apparatus 106 is communicably connected to the controller of the printer body 101. The controller of the printer body 101 controls the operation (image forming operation) of the printer body 101, and controls the overall operation of the image forming apparatus 100. The controller 106C of the sheet processing apparatus 106 receives information (whether bonding needs to be performed in the heat-and-pressure bonding portion 167, the number of sheets constituting one copy of product, the sheet size, the sheet conveyance timing, etc.) about the image forming operation that is being executed from the controller of the printer body 101. The controller of the printer body 101 and the controller 106C of the sheet processing apparatus 106 that cooperate are examples of control circuits that control the image forming apparatus 100 of the present embodiment.

The flowchart of FIG. 18 is started in the case where the image forming apparatus 100 executes a job (hereinafter referred to as a booklet making job) in which sheets on which images have been formed by the printer body 101 one sheet at a time are bonded in the sheet processing apparatus 106 to create a sheet bundle. Each step of the flowchart is realized by the CPU of the controller 106C executing the program described above. In the description below, the heat-and-pressure bonding operation of the first embodiment will be described in accordance with the flowchart of FIG. 18 with reference to FIGS. 9A to 9F.

When a booklet making job is input to the image forming apparatus 100, images are formed on the sheets S one sheet at a time by the printer body 101, and the bonding toner image 39 illustrated in FIG. 2 is formed in the bonding region on the sheet S. In step S101, the sheet processing apparatus 106 receives the sheets S discharged one by one from the printer body 101, forms the sheet bundle in which a predetermined number of the sheets S per copy are stacked in the buffering portion 120, and receives the sheet bundle at the alignment portion 156. The sheet bundle is aligned (longitudinally aligned) in the Y direction one sheet at a time in step S102 by the alignment operation of the alignment portion 156 described above, and is collectively aligned (laterally aligned) in the X direction in step S103.

FIG. 9A illustrates the same state as FIG. 7C, that is, a state in which the longitudinal alignment of the sheets S1 to S5 in the sheet conveyance direction (Y direction) has been completed. In this state, the pressurizing unit 171 is at a position away from the sheet in the Z direction. FIG. 9B illustrates the same state as FIG. 7D, that is, a state in which the lateral alignment of the sheets S1 to S5 has been completed. The sheets S1 to S5 are aligned in the sheet width direction (X direction) by being caused to abut the width alignment standard plates 172*a* and 172*b*.

After the alignment of the sheets S1 to S5, the normal rotation of the motor 177 is started in step S104, and thus the movement of the pressurizing unit 171 is started. FIG. 9C illustrates a state in which the pressurizing unit 171 has started moving in the pressurizing direction (−Z direction), and the contact surface 169*a* of the pressurizing plate 169 has come into contact with the uppermost sheet S5.

In the state of FIG. 9C, the rack gear 175 is still abutting the upper surface portion 172*d* of the lift plate 172 by the urging force of the compression spring 174. That is, while the pressurizing unit 171 moves from the retracted position illustrated in FIG. 9B to the contact position illustrated in FIG. 9C where the pressurizing plate 169 is in contact with the upper surface of the sheet bundle, the rack gear 175 does not relatively move with respect to the pressurizing unit 171. In addition, while the pressurizing unit 171 moves from the retracted position illustrated in FIG. 9B to the contact position illustrated in FIG. 9C, the signal value of the photo-interrupter 176 is ON indicating the light-transmitting state.

As a result of the normal rotation of the motor 177 being further continued from the state of FIG. 9C, the rack gear 175 relatively moves in the pressurizing direction (−Z direction) with respect to the pressurizing unit 171 as illustrated in FIG. 9D. That is, while the movement of the pressurizing plate 169 receives a repulsive force in the +Z direction from the sheet bundle and thus the movement of the pressurizing unit 171 in the pressurizing direction (−Z direction) is suppressed, the rack gear 175 continues moving in the pressurizing direction (−Z direction). The compression spring 174 contracts by being pressed by the lower surface of the rack gear 175, and the restoration force of the compression spring 174 increases in accordance with the movement amount of the rack gear 175. This restoration force of the compression spring 174 is applied to the pressurizing unit 171, and thus the pressurizing plate 169 and the receiving plate 180 pressurize the sheets S1 to S5.

Here, when the rack gear 175 starts relatively moving with respect to the pressurizing unit 171, the rib 172*e* blocks the optical path of the photo-interrupter 176, and the signal value of the photo-interrupter 176 changes from ON to OFF indicating the light-blocked state. The controller 106C continues the normal rotation of the motor 177 by a predetermined driving amount from the time point when the signal of the photo-interrupter 176 changes from ON to OFF (Y in step S105), and then stops the motor 177 in step S106. The predetermined driving amount is set in advance, and for example, is stored in the storage device of the controller 106C illustrated in FIG. 17, and read out by the CPU.

After step S106, in step S107, the stopped state of the motor 177 is maintained for a preset time (predetermined time) for performing the heat-and-pressure bonding of the sheets S1 to S5. As a result of this, sheets in the sheets S1 to S5 are bonded together. The predetermined time is, for example, stored in the storage device of the controller 106C illustrated in FIG. 17, and is read out by the CPU. After the elapse of the predetermined time, the motor 177 is rotated in the reverse direction in step S108, thus the rack gear 175 moves in the +Z direction, and thus the pressurizing unit 171 moves from the pressurizing position to the retracted position. FIG. 9E illustrates a state in which the pressurizing unit 171 has retracted to the retracted position.

In the case where there is still a sheet that constitutes the copy of booklet and is yet to be processed, that is, in the case where the result of step S109 is N, the process returns to step S101 and a similar process is repeated. To be noted, in the present embodiment, while the operation on the preceding sheet bundle (S1 to S5) is performed in the heat-and-pressure bonding portion 167, the reception and alignment (steps S101 to S103) of the succeeding sheet bundle (S6 to S10) at the alignment portion 156 can be started. FIG. 9D illustrates the fact that the next sheets S6 to S10 can be received by the alignment portion 156 in parallel with the heat-and-pressure bonding of the sheets S1 to S5. In addition, FIG. 9E illustrates a state in which the alignment of the next sheets S6 to S10 is performed after the heat-and-pressure bonding of the sheets S1 to S5, and the sheets S6 to S10 are caused to abut the width alignment standard plates 172*a* to 172*b* after the pressurizing unit 171 has retracted.

The operation of the sheets S6 to S10 during heat-and-pressure bonding is substantially the same as the operation of the sheets S1 to S5 during heat-and-pressure bonding. That is, in step S104, after the alignment of the sheets S6 to S10, the normal rotation of the motor 177 is started, and thus the movement of the pressurizing unit 171 is started. As a result of the normal rotation of the motor 177 being further continued after the pressurizing unit 171 has come into contact with the upper surface of the sheet S10, the rack gear 175 relatively moves in the pressurizing direction (−Z direction) with respect to the pressurizing unit 171 as illustrated in FIG. 9F. The compression spring 174 contracts by being pressed by the lower surface of the rack gear 175, and the restoration force of the compression spring 174 increases in accordance with the movement amount of the rack gear 175. This restoration force of the compression spring 174 is added to the pressurizing unit 171, and thus the pressurizing plate 169 pressurizes the sheets S6 to S10.

As described above, when the rack gear 175 starts relatively moving with respect to the pressurizing unit 171, the rib 172*e* blocks the optical path of the photo-interrupter 176, and the signal value of the photo-interrupter 176 changes from ON to OFF indicating the light-blocked state. The controller 106C continues the normal rotation of the motor 177 is continued by a predetermined driving amount from the time point when the signal of the photo-interrupter 176 changes from ON to OFF (Y in step S105), and then stops the motor 177 in step S106.

As described above, the driving amount of the motor 177 is controlled on the basis of the detection signal of the photo-interrupter 176 that detects the change in the positional relationship between the rack gear 175 and the pressurizing unit 171. As a result of this, the pressurizing force applied to the sheet bundle during heat-and-pressure bonding can be controlled with a higher precision. For example, in the present embodiment, the driving amount of the motor 177 from the switching of the photo-interrupter 176 from ON to OFF to the stoppage of the motor 177 is the same for a case where the thickness of the sheet bundle is a first thickness (for example, the case of FIGS. 9B and 9C) and a case where the thickness of the sheet bundle is a second thickness larger than the first thickness (for example, the case of FIGS. 9E and 9F). As a result of this, the pressurizing force applied from the pressurizing plate 169 to the sheet bundle can be made constant regardless of the thickness of the sheet bundle.

After step S106, the stopped state of the motor 177 is maintained in step S107 for a predetermined time. As a result of this, sheets in the sheets S6 to S10 are bonded together. In addition, during heat-and-pressure bonding of the sheet S6 to S10, the sheets S5 and S6 are bonded together by heat-and-pressure bonding via a bonding toner image or bonding toner images formed on the upper surface of the sheet S5 and/or the lower surface of the sheet S6, and thus the sheets S1 to S10 become one bonded product. After the elapse of the predetermined time, the motor 177 is rotated in the reverse direction, thus the rack gear 175 moves in the +Z direction, and thus the pressurizing unit 171 moves from the pressurizing position to the retracted position in step S108.

As described above, the heat-and-pressure bonding portion 167 performs the heat-and-pressure bonding operation once each time a predetermined number of sheets are aligned by the alignment portion 156, and thus a booklet formed from sheets of a number larger than the predetermined number can be created. After the heat-and-pressure bonding is completed for all the sheets constituting one booklet is completed, that is, in the case where the result of step S109 is Y, the created booklet (sheet bundle) is discharged in step S110 by a bundle discharge operation that will be described later.

To be noted, although an example in which a booklet constituted by ten sheets S1 to S10 has been described as an example herein, a booklet constituted by tens or more of sheets can be also created. In addition, although a sequence in which the heat-and-pressure bonding operation is performed for each predetermined number of sheets has been described, the number of sheets subjected to heat-and-pressure bonding in one heat-and-pressure bonding operation may be changed within one booklet. For example, the heat-and-pressure bonding operation can be performed by first performing heat-and-pressure bonding on two sheets and then performing heat-and-pressure bonding on each sheet one sheet at a time.

Bundle Discharge Operation

After the heat-and-pressure bonding is completed for all sheets constituting one booklet, the booklet is pushed out from the alignment portion 156 and the heat-and-pressure bonding portion 167 by the longitudinal alignment standard plate 154 illustrated in FIG. 5, and is conveyed in a direction (−Y direction) toward the bundle discharge roller pair 136 illustrated in FIG. 1 in the sheet conveyance direction. In other words, the longitudinal alignment standard plate 154 is an example of a push-out member that pushes out the sheet bundle from the alignment portion 156 and the heat-and-pressure bonding portion 167. To be noted, a push-out member that pushes out the processed sheet bundle may be provided in addition to the longitudinal alignment standard plate 154 serving as a standard for aligning the sheet bundle.

The bundle discharge roller pair 136 is a roller pair capable of opening and closing (coming into and out of contact), and receives the booklet from the discharge conveyance path 138 in a separated state. After the leading end of the booklet in the direction in which the longitudinal alignment standard plate 154 pushes out the booklet has passed the position of the bundle discharge roller pair 136, the movement of the longitudinal alignment standard plate 154 is stopped, and the bundle discharge roller pair 136 is switched to the contact state. As a result of this, the bundle discharge roller pair 136 nips and conveys the booklet, and discharges the booklet onto the lower discharge tray 137. Meanwhile, the longitudinal alignment standard plate 154 returns to the standby position after passing the booklet onto the bundle discharge roller pair 136. The bundle discharge roller pair 136 is an example of a discharge portion that discharges the bonded sheet bundle, and may have a configuration in which the longitudinal alignment standard plate 154 discharges the sheet bundle to the outside of the sheet processing apparatus 106 as it is.

First Modification Example

In the first embodiment, an example in which the pressurizing force during heat-and-pressure bonding is made constant regardless of the thickness of the sheet bundle has been described, but the pressurizing force may be changed in accordance with the characteristics of the heat-and-pressure bonding portion 167, the characteristics of the sheet to be used, the number of sheets in the heat-and-pressure bonding, and the like. For example, in the case of creating one copy of booklet, the pressurizing force of the first heat-and-pressure bonding operation may be set to be higher than the pressurizing force of other heat-and-pressure bonding operations. In addition, in the case of creating one copy of the booklet, the pressurizing force may be gradually increased in accordance with the increase in the number of times of the heat-and-pressure bonding operation (increase in the thickness of the sheet bundle during heat-and-pressure bonding). Also in these cases, according to the configuration of the present embodiment, the pressurizing force applied to the sheet bundle during heat-and-pressure bonding can be made closer to a desired value.

Second Modification Example

In the first embodiment, a configuration in which the pressurizing force during heat-and-pressure bonding is caused to be a desired value regardless of the sheet bundle by controlling the driving amount of the motor 177 by using a sensor (photo-interrupter 176) that detects change in the positional relationship between the rack gear 175 and the pressurizing unit 171 has been described as an example. The configuration is not limited to this, and a similar advantage can be obtained by providing a detection portion capable of detecting contact of the pressurizing plate 169 with the sheet bundle or an estimating portion that estimates a timing at which the pressurizing plate 169 comes into contact with the sheet bundle.

For example, deceleration or stoppage of the pressurizing unit 171 at the contact of the pressurizing plate 169 with the sheet bundle may be detected by using a code wheel that rotates in an interlocked manner with the movement of the pressurizing unit 171 and a photo-interrupter that detects the rotation of the code wheel. The code wheel and the photo-interrupter 176 constitute a so-called rotary encoder. In addition, deceleration or stoppage of the pressurizing unit 171 at the contact of the pressurizing plate 169 with the sheet bundle may be detected by detecting, by a line sensor, the position of a detected portion provided on the pressurizing unit 171. In addition, contact of the pressurizing plate with the sheet may be detected by using a load cell. In addition, contact of the pressurizing plate with the sheet may be detected by using a thermistor. In addition, contact of the pressurizing plate with the sheet may be detected by detecting change in the electric resistance of the sheet bundle. As described above, the pressurizing force during the heat-and-pressure bonding can be also caused to be a desired value regardless of the thickness of the sheet bundle by providing a detection portion that detects contact of the pressurizing plate 169 with the sheet bundle and controlling the driving amount of the motor 177 on the basis of the detection result thereof.

In addition, the timing at which the pressurizing plate 169 comes into contact with the sheet bundle may be estimated by estimating the thickness of the sheet bundle at the time of heat-and-pressure bonding by counting the accumulated number of sheets conveyed to the heat-and-pressure bonding portion 167. In addition, the timing at which the pressurizing plate 169 comes into contact with the sheet bundle may be estimated by estimating the thickness of the sheet bundle on the basis of the thickness per sheet detected by an ultrasonic wave sensor in addition to the count of the number of sheets. The ultrasonic wave sensor is an example of a thickness detection portion (media sensor) capable of detecting information about the thickness per sheet, and for example, an optical sensor that identifies the material of the sheet on the basis of light transmittance may be also used. In addition, the timing at which the pressurizing plate 169 comes into contact with the sheet bundle may be estimated by measuring, by using a distance measurement sensor, the position of the upper surface of the sheet bundle in a state after the alignment of the sheet bundle has been completed and before the movement of the pressurizing unit 171 in the pressurizing direction (−Z direction) is started. As described above, the pressurizing force during the heat-and-pressure bonding can be also set to a desired value by a method of providing an estimation portion that estimates the timing at which the pressurizing plate 169 comes into contact with the sheet bundle and controlling the driving amount of the motor 177 on the basis of the estimation result.

Third Modification Example

In addition, although the rack-and-pinion mechanism including the pinion gear 179 and the rack gear 175 has been described as an example of a mechanism that lifts and lowers the pressurizing unit 171 in the first embodiment, a different driving mechanism may be used. For example, a cam mechanism that moves the pressurizing unit 171 in the Z direction by a cam rotating by the driving force of the motor 177 pressing a cam follower coupled to the pressurizing unit 171. In addition, the pressurizing unit 171 may be coupled to the motor 177 via a link mechanism and configured to reciprocate in the Z direction in accordance with the rotation of the motor 177.

Second Embodiment

A second embodiment will be described with reference to FIG. 10. Part of the configuration of a heat-and-pressure bonding portion 205 of the present embodiment is different from the heat-and-pressure bonding portion 167 of the first embodiment, and elements of the image forming apparatus 100 other than the heat-and-pressure bonding portion 205 can be configured in the same manner as in the first embodiment. In the description below, it is assumed that elements denoted by the same reference signs as in the first embodiment substantially have the same configurations and effects as those described in the first embodiment, and parts different from the first embodiment will be mainly described.

Figure 10:
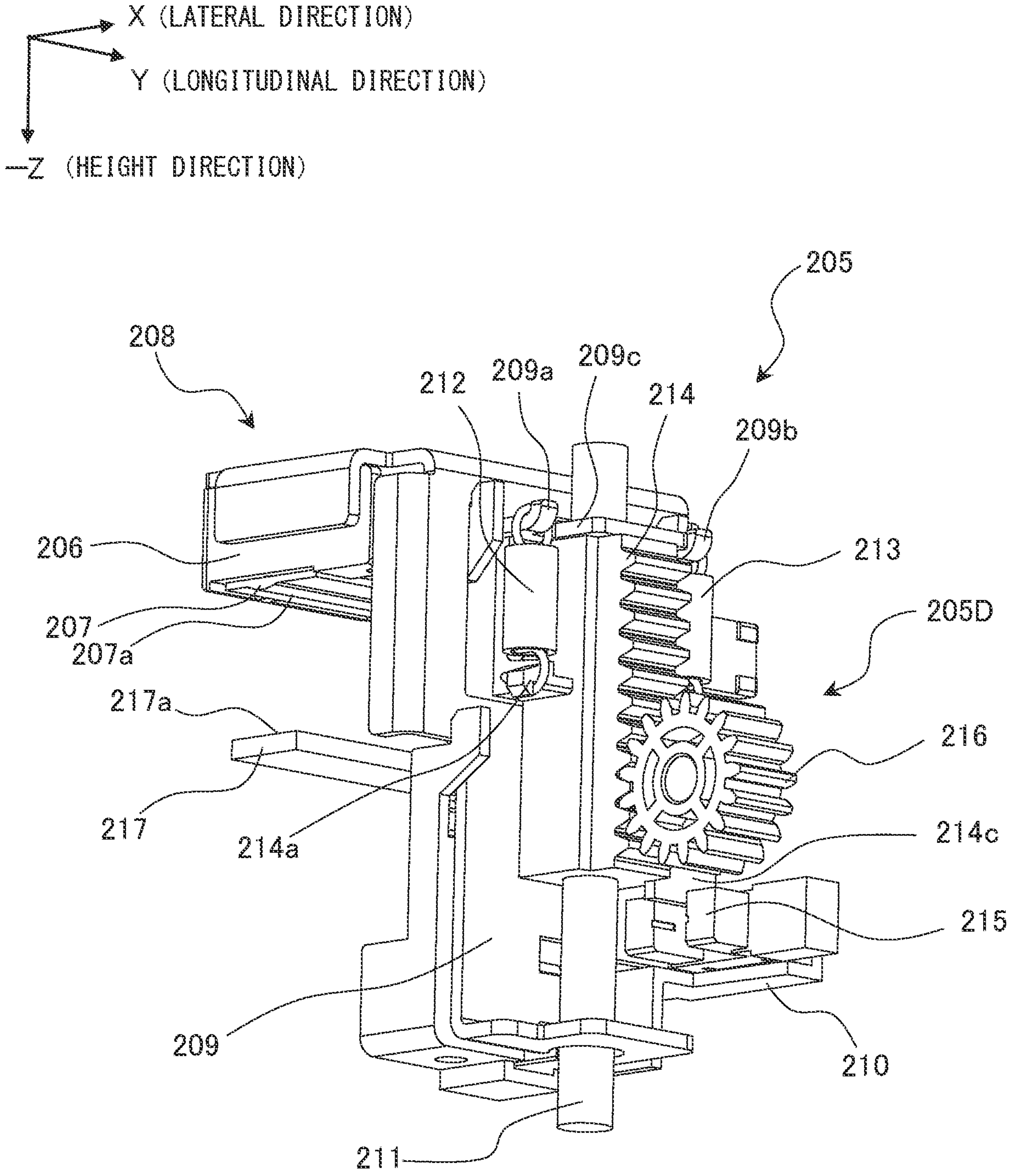
FIG. 10 is a diagram illustrating a heat-and-pressure bonding portion according to a second embodiment.

FIG. 10 is a perspective view of the heat-and-pressure bonding portion 205 of the second embodiment. The heat-and-pressure bonding portion 205 is an example of a sheet bonding apparatus (booklet making apparatus, bonding unit, bonding portion, heat-and-pressure bonding mechanism, or sticking processing portion) that bonds sheets together. As illustrated in FIG. 10, the heat-and-pressure bonding portion 205 includes a pressurizing unit 208 including a pressurizing plate 207, a receiving plate 217 opposing the pressurizing plate 207, a heater provided in the pressurizing unit 208, and a driving system 205D that drives the pressurizing unit 208. The driving system 205D includes a motor serving as a drive source, a pinion gear 216, a rack gear 214, and a gear train coupling the motor to the pinion gear 216. In addition, the heat-and-pressure bonding portion 205 includes tension springs 212 and 213 provided between the rack gear 214 and the pressurizing unit 208.

The pressurizing plate 207 is an example of a pressurizing member (first pressurizing member), and the pressurizing unit 208 is an example of a pressurizing portion. The receiving plate 217 is an example of a receiving member (second pressurizing member) opposing the pressurizing member. The rack gear 214 is an example of a moving portion that moves the pressurizing member (pressurizing unit). The heater is an example of a heating portion that heats the sheet bundle. The tension springs 212 and 213 are each an example of an elastic member provided between the pressurizing unit and the moving portion.

The receiving plate 217 is formed from an elastic material (elastomer), for example, silicone rubber. The receiving plate 217 is fixed to a frame body of the heat-and-pressure bonding portion 205, and receives the pressurizing force of the pressurizing unit 208. The receiving plate 217 has a plate shape elongated in the Y direction and having the Z direction as the thickness direction. The receiving plate 217 has a contact surface 217*a* that comes into contact with the lower surface of the sheet. The contact surface 217*a* of the present embodiment is a flat surface spreading substantially orthogonally with respect to the Z direction.

The pressurizing unit 208 includes the pressurizing plate 207, a holder 206, and a lift plate 209. In addition, the heater of the present embodiment is provided in the pressurizing unit 208. The pressurizing plate 207, the heater, and the holder 206 serve as a heater portion (heater unit) held by the lift plate 209 serving as a holding member.

The pressurizing plate 207 has a plate shape elongated in the Y direction and having the Z direction as the thickness direction. The pressurizing plate 207 is formed from, for example, aluminum. The heat-and-pressure bonding portion 205 of the second embodiment can perform corner binding in which the sheet bundle stacked in the alignment portion 156 is bonded at the corner portion thereof by using the pressurizing plate 207. In addition, the region where the bonding toner image is formed on the sheet in the printer body 101 is set at the corner portion of the sheet. To be noted, although the pressurizing plate 207 of the second embodiment is longer than the long side of an A4 sheet, the binding may be performed by a binding method different from the corner binding by repeating bonding while moving the heat-and-pressure bonding portion 205 with respect to the sheet bundle or moving the sheet bundle with respect to the heat-and-pressure bonding portion 205.

The pressurizing plate 207 has a contact surface 207*a* that comes into contact with the upper surface of the sheet. The contact surface 207*a* of the present embodiment includes a ridge portion that is a protruding shape whose center portion in the X direction protrudes more in the pressurizing direction (−Z direction) than end portions thereof in the X direction and extending in the Y direction. By providing the protruding shape (ridge portion) on the pressurizing plate 207, the pressurizing plate 207 can apply more consistent pressurizing force regardless of the part tolerance, assembly tolerance, and the like.

As the heater, a ceramic heater in which a pattern of a heat-generating resistor is formed on a ceramic substrate can be used. The heater is disposed to be in contact with the back surface of the pressurizing plate 207. The pressurizing plate 207 and the heater are held by the holder 206. The holder 206 is fastened to the lift plate 209. The lift plate 209 integrally moves with the heater portion of the pressurizing unit 208.

The pressurizing unit 208 is capable of moving to a pressurizing position (position during heat-and-pressure bonding) where the pressurizing plate 207 pressurizes the sheet bundle, and a retracted position (standby position) in which the pressurizing plate 207 is retracted (separated) in the Z direction from the upper surface of the sheet bundle. The pressurizing position of the pressurizing unit 208 can change in accordance with the thickness of the sheet bundle between the pressurizing plate 207 and the receiving plate 217.

In addition, a temperature detection element such as a thermistor is disposed in the pressurizing unit 208 as a temperature detection portion that detects the temperature of the heater. The controller 106C of the sheet processing apparatus 106 illustrated in FIG. 17 is capable of controlling the surface temperature of the pressurizing plate 207 to a predetermined temperature suitable for heat-and-pressure bonding by controlling power supply to the heater on the basis of a detection signal of the temperature detection element.

The pinion gear 216 is coupled to the motor 177 via the gear train. The pinion gear 216 is engaged with the rack gear 214. The rack gear 214 is guided by a guide shaft 211 having a columnar shape extending in the Z direction, and is capable of reciprocating in the Z direction. The guide shaft 211 is fixed to the frame body of the heat-and-pressure bonding portion 205. The rack gear 214 moves in the Z direction as a result of the driving force of the motor being transmitted thereto via the pinion gear 216. The rack gear 214 is capable of relatively moving in the Z direction with respect to the pressurizing unit 208.

The tension springs 212 and 213 are provided between the rack gear 214 and the lift plate 209 of the pressurizing unit 208. A hook at an end of the tension spring 212 is hooked on a hooking shape 209*a* of the lift plate 209, and a hook at the other end of the tension spring 212 is hooked on a hooking shape 214*a* of the rack gear 214. A hook at an end of the tension spring 213 is hooked on a hooking shape 209*b* of the lift plate 209, and a hook at the other end of the tension spring 213 is hooked on an unillustrated hooking shape of the rack gear 214.

In the case where the heat-and-pressure bonding portion 205 does not perform heat-and-pressure bonding of the sheet bundle, the rack gear 214 is caused to abut an upper surface portion 209*c* of the lift plate 209 by an urging force in the +Z direction received from the tension springs 212 and 213. In this case, the pressurizing unit 208 is positioned at the retracted position.

In the case where the heat-and-pressure bonding portion 205 performs heat-and-pressure bonding of the sheets, the rack gear 214 moves in the pressurizing direction (−Z direction) by the driving force transmitted thereto from the motor. As a result of this, the pressurizing unit 208 moves in the pressurizing direction (−Z direction), and the pressurizing plate 207 comes into contact with the upper surface of the sheet bundle. As a result of the rack gear 214 moving further in the pressurizing direction (−Z direction) after the pressurizing plate 207 has come into contact with the upper surface of the sheet bundle, the pressurizing plate 207 pressurizes the sheet bundle. When the heat-and-pressure bonding portion 205 performs heat-and-pressure bonding of the sheet bundle, the tension springs 212 and 213 are elastically deformed by the driving force of the motor, and the pressurizing plate 207 and the receiving plate 217 pressurize the sheet bundle by the restoration force (elastic force) of the tension springs 212 and 213.

In addition, the heat-and-pressure bonding portion 205 of the present embodiment is provided with a photo-interrupter 215 capable of detecting change in the positional relationship between the rack gear 214 and the pressurizing unit 208. The photo-interrupter 215 is held by a sensor holder 210 fixed to the lift plate 209, and is configured to move integrally with the pressurizing unit 208. The rack gear 214 is provided with a rib 214*c* serving as a detected portion to be detected by the photo-interrupter 215. The photo-interrupter 215 includes a light-emitting element that emits light, and a light-receiving element that opposes the light-emitting element and outputs a signal corresponding to a light reception amount, and the signal value changes in accordance with whether or not the rib 214*c* blocks an optical path from the light-emitting element to the light-receiving element. The controller 106C illustrated in FIG. 17 can detect the change in the positional relationship between the rack gear 214 and the pressurizing unit 208 on the basis of the signal value output from the photo-interrupter 215.

The operation of the heat-and-pressure bonding portion 205 in the second embodiment is substantially the same as the operation of the heat-and-pressure bonding portion 167 described in the first embodiment, and therefore description thereof will be omitted.

Here, the position of the rack gear 214 in the case of retracting the pressurizing plate 207 from the sheet bundle will be referred to as a first position. The position of the rack gear 214 where the pressurizing plate 207 has been moved from the position retracted from the sheet bundle toward the receiving plate 217 and has come into contact with the sheet bundle will be referred to as a second position. The position of the rack gear 214 while the pressurizing plate 207 and the receiving plate 217 are pressurizing the sheet bundle will be referred to as a third position.

The deformation amount of the tension springs 212 and 213 is constant while the rack gear 214 moves from the first position to the second position. In addition, in the case where the rack gear 214 moves from the second position to the third position, the deformation amount of the tension springs 212 and 213 increases in accordance with the movement amount from the second position, and the pressurizing plate 207 and the receiving plate 217 pressurize the sheet bundle by the restoration force of the tension springs 212 and 213. That is, the present embodiment is configured such that the deformation amount of the elastic member is constant while the moving portion moves from the first position to the second position. In addition, the present embodiment is configured such that in the case where the moving portion moves from the second position to the third position, the deformation amount of the elastic member increases in accordance with the movement amount from the second position, and the pressurizing member and the receiving member pressurize the sheet bundle by the restoration force of the elastic member.

As described above, the deformation amount of the tension springs 212 and 213 increases in accordance with the movement amount of the pressurizing unit 208 from the time point at which the pressurizing plate 207 comes into contact with the sheet bundle. Therefore, also according to the configuration of the present embodiment in which the type of the elastic member is different from the first embodiment, a sheet bonding apparatus (booklet making apparatus) and an image forming apparatus capable of adjusting the pressurizing force for bonding sheets together to a desired value can be provided. In addition, according to the present embodiment, fluctuation of the pressurizing force for bonding sheets together depending on the thickness of the sheet bundle can be reduced.

In addition, by controlling the driving amount of the motor on the basis of the detection signal of the photo-interrupter 215 that detects the change in the positional relationship between the rack gear 214 and the pressurizing unit 208, the pressurizing force applied to the sheet bundle during heat-and-pressure bonding can be controlled with a higher precision regardless of the thickness of the sheet bundle. For example, in the present embodiment, the pressurizing force applied from the pressurizing plate 207 to the sheet bundle can be made constant regardless of the thickness of the sheet bundle.

Modification Examples

To be noted, the compression spring 174 of the first embodiment and the tension springs 212 and 213 of the second embodiment are examples of elastic members that generate pressurizing force of the pressurizing member in accordance with the position of the rack gear (moving portion), and a different elastic member may be used. For example, an elastic member of a rubber material may be used.

Third Embodiment

A third embodiment will be described with reference to FIGS. 11, 12A to 12C, and 19. Part of the configuration of a heat-and-pressure bonding portion 164 of the present embodiment is different from the heat-and-pressure bonding portion 167 of the first embodiment, and elements of the image forming apparatus 100 other than the heat-and-pressure bonding portion 164 can be configured in the same manner as in the first embodiment. In the description below, it is assumed that elements denoted by the same reference signs as in the first embodiment substantially have the same configurations and effects as those described in the first embodiment, and parts different from the first embodiment will be mainly described.

Figure 11:
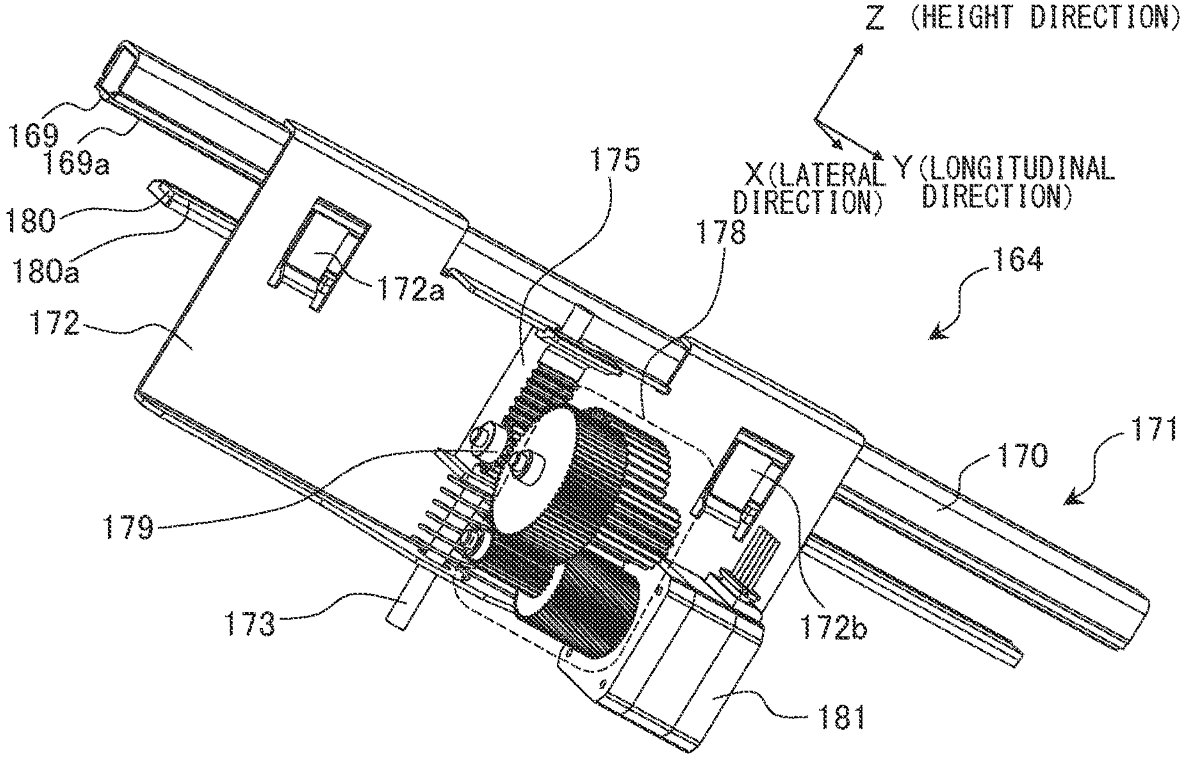
FIG. 11 is a diagram illustrating a heat-and-pressure bonding portion according to a third embodiment.
Figure 12C:
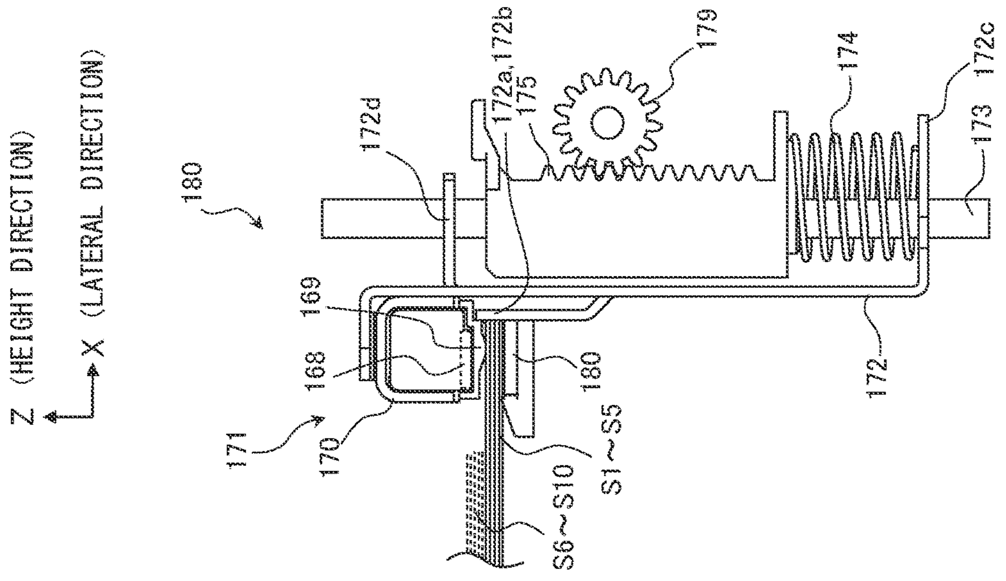
FIGS. 12A to 12C are diagrams illustrating an operation of the heat-and-pressure bonding portion according to the third embodiment.
Figure 12B:
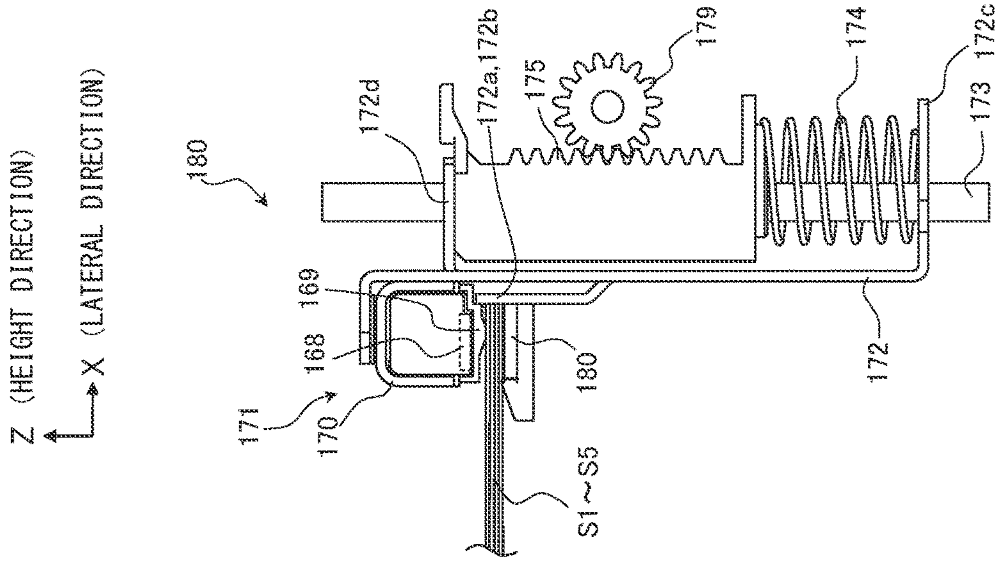
Figure 12A:
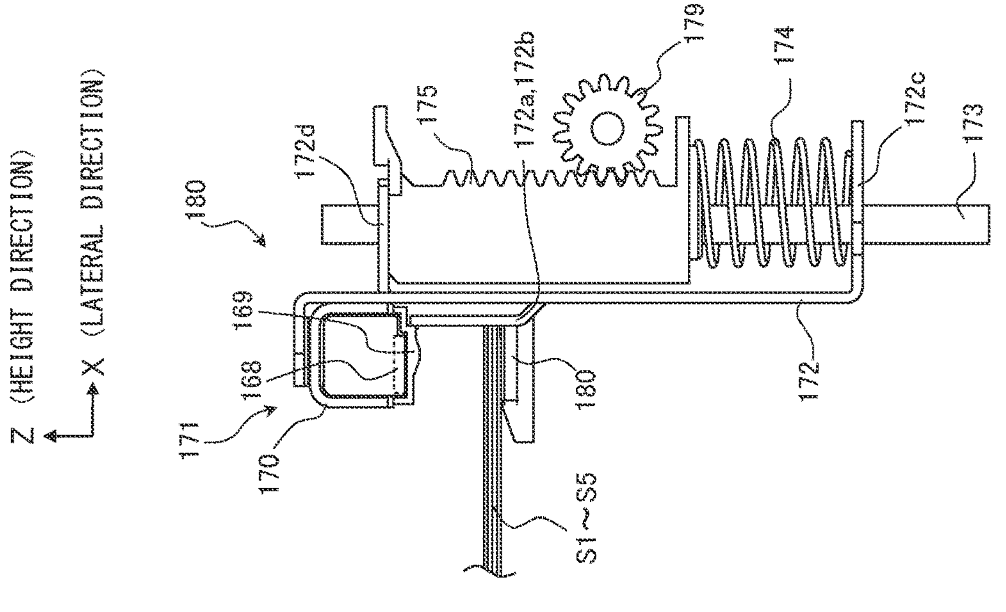
Figure 19:
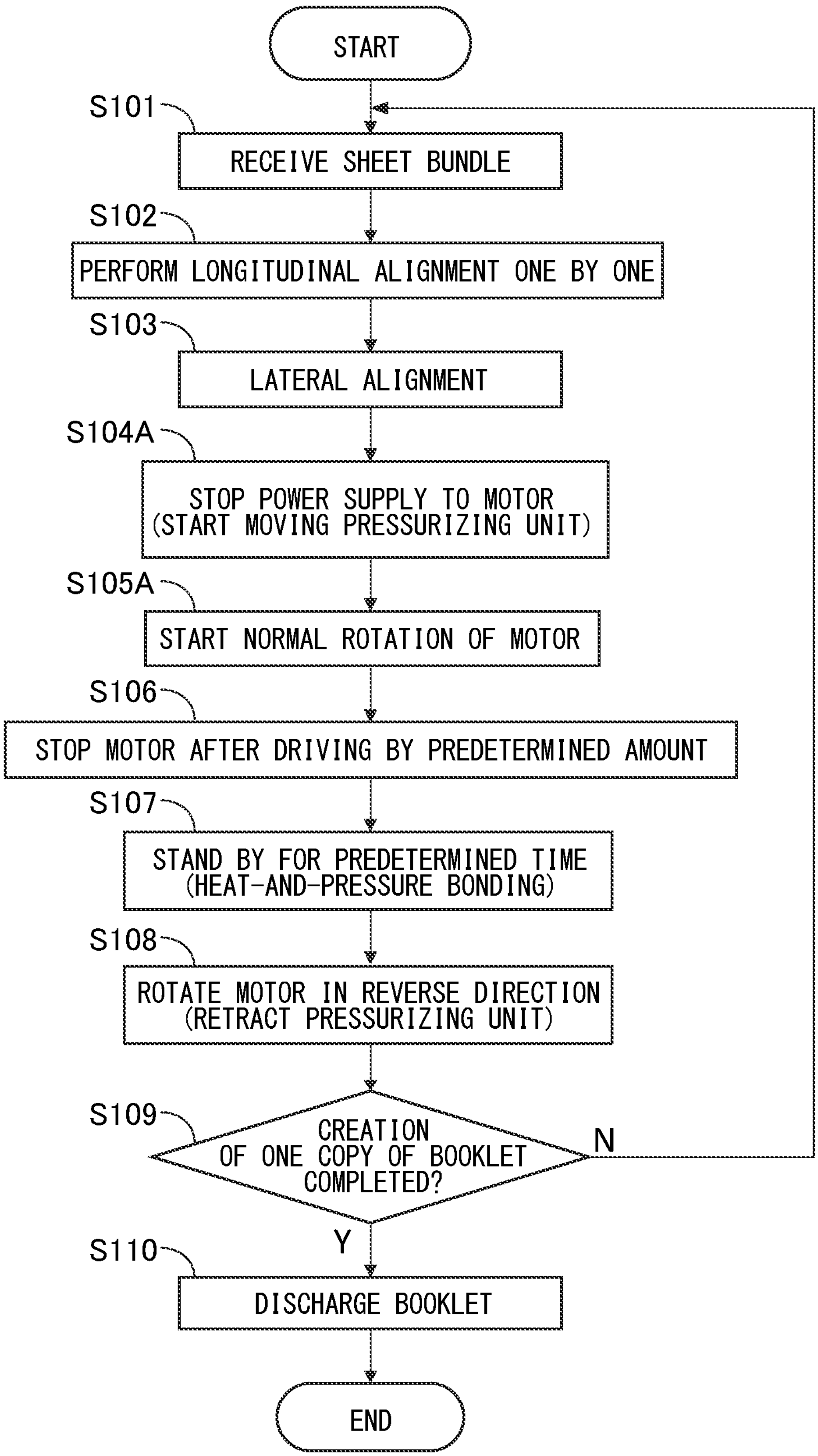
FIG. 19 is a flowchart illustrating a control example of a sheet processing apparatus according to the third embodiment.

FIG. 11 is a perspective view of the heat-and-pressure bonding portion 164 according to the third embodiment. FIGS. 12A to 12C are each a diagram illustrating the heat-and-pressure bonding portion by the heat-and-pressure bonding portion 164. FIG. 19 is a flowchart illustrating a control example of the sheet processing apparatus 106 in the third embodiment. To be noted, steps S104A and S105A are different from the first embodiment, and steps S101 to S103 and S106 to S110 can be performed in the same manner as the first embodiment.

As illustrated in FIG. 11, the heat-and-pressure bonding portion 164 of the third embodiment has a configuration in which the photo-interrupter 176 and the rib 172*e* of the lift plate 172 of the heat-and-pressure bonding portion 167 of the first embodiment are omitted. In addition, the characteristics of a motor 181 that lifts and lowers the pressurizing unit 171 are changed such that the pressurizing unit 171 moves down in the pressurizing direction (−Z direction) by its own weight in the case where power is not supplied to the motor 181, and thus the idling torque while power is not supplied is lowered.

Also in the present embodiment, the deformation amount of the compression spring 174 is constant while the rack gear 175 moves from the first position to the second position. In addition, in the case where the rack gear 175 moves from the second position to the third position, the deformation amount of the compression spring 174 increases in accordance with the movement amount from the second position, and the pressurizing plate 169 and the receiving plate 180 pressurize the sheet bundle by the restoration force of the compression spring 174. That is, the present embodiment is configured such that the deformation amount of the elastic member is constant while the moving portion moves from the first position to the second position. In addition, the present embodiment is configured such that in the case where the moving portion moves from the second position to the third position, the deformation amount of the elastic member increases in accordance with the movement amount from the second position, and the pressurizing member and the receiving member pressurize the sheet bundle by the restoration force of the elastic member.

As described above, in the present embodiment, a configuration in which the deformation amount of the compression spring 174 changes in accordance with the movement amount of the pressurizing unit 171 after the pressurizing plate 169 has come into contact with the sheet bundle is employed. Therefore, also according to the configuration of the present embodiment, a sheet bonding apparatus (booklet making apparatus) and an image forming apparatus capable of adjusting the pressurizing force for bonding sheets together to a desired value can be provided. In addition, according to the present embodiment, fluctuation of the pressurizing force for bonding sheets together depending on the thickness of the sheet bundle can be suppressed.

The heat-and-pressure bonding operation of the heat-and-pressure bonding portion 164 will be described with reference to FIGS. 12A to 12C, and 19. FIGS. 12A to 12C are each a diagram illustrating the heat-and-pressure bonding portion 164 as viewed in the sheet conveyance direction (Y direction). To be noted, in the present embodiment, since the pressurizing unit 171 moves down in the pressurizing direction (−Z direction) by its own weight while power is not supplied to the motor as described above, the motor 181 is rotated in the reverse direction in advance before the sheets are received by the alignment portion 156, and the pressurizing unit 171 is lifted in the retracting direction (+Z direction). As a result of this, a space for aligning the sheets in the sheet width direction (X direction) can be secured.

FIG. 12A illustrates a state in which alignment of the sheets S1 to S5 in the sheet width direction has been completed in step S103. Then, in step S104A, the controller 106C illustrated in FIG. 17 stops power supply to the motor 181. As a result of this, the pressurizing unit 171 moves in the pressurizing direction (−Z direction) by its own weight as illustrated in FIG. 12B, and stops at the contact position where the contact surface 169*a* of the pressurizing plate 169 is in contact with the uppermost sheet S5. In addition, the rack gear 175 also moves in the pressurizing direction (−Z direction) together with the pressurizing unit 171.

Next, the controller 106C starts supplying power to the motor 181 and starts driving the motor 181 in the normal rotation direction in step S105A, and then stops the motor 181 in step S106 after driving the motor 181 by a predetermined driving amount. The predetermined driving amount is set in advance and is, for example, stored in the storage device of the controller 106C illustrated in FIG. 17, and is read out by the CPU. As described above, by performing control such that the movement amount of the rack gear 175 from the time point at which the pressurizing plate 169 comes into contact with the upper surface of the sheet bundle is constant, the deformation amount of the compression spring 174 can be made constant, that is, the pressurizing force applied to the sheet bundle can be made constant regardless of the thickness of the sheet bundle.

As described above, in the present embodiment, the configuration in which the pressurizing unit 171 comes into contact with the sheet bundle by its own weight is utilized unlike the first embodiment in which the contact of the pressurizing unit 171 with the sheet bundle is detected by a sensor such as a photo-interrupter. The motor 181 is driven after the pressurizing unit 171 has come into contact with the sheet bundle by its own weight. That is, the controller of the present embodiment allows the moving portion to move from the first position to the second position by the own weight of the pressurizing member and then moves the moving portion from the second position to the third position by driving the drive source by a preset driving amount. As a result of this, the pressurizing force applied to the sheet bundle during heat-and-pressure bonding can be controlled with higher precision regardless of the thickness of the sheet bundle. Modification Examples To be noted, although an example in which the pressurizing unit 171 is held at the retracted position by rotating the motor 181 in the reverse direction has been described as an example, the configuration is not limited to this. For example, a restriction member (stopper) driven by the motor 181 or a different actuator (such as a solenoid) may be provided, and thus the pressurizing unit 171 may be held at the retracted position.

Fourth Embodiment

Figure 20:
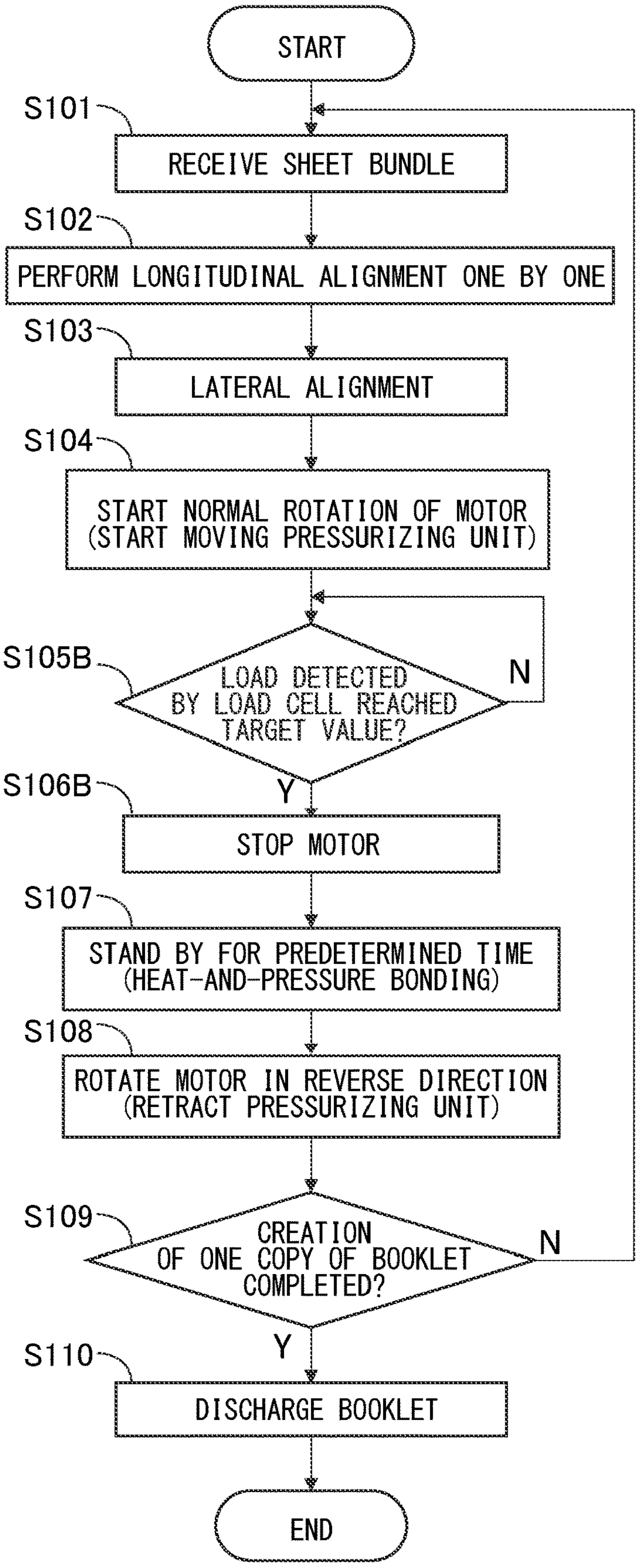
FIG. 20 is a flowchart illustrating a control example of a sheet processing apparatus according to the fourth embodiment.

A fourth embodiment will be described with reference to FIGS. 13 and 20. Part of the configuration of a heat-and-pressure bonding portion 182 of the present embodiment is different from the heat-and-pressure bonding portion 167 of the first embodiment, and elements of the image forming apparatus 100 other than the heat-and-pressure bonding portion 182 can be configured in the same manner as in the first embodiment. In the description below, it is assumed that elements denoted by the same reference signs as in the first embodiment substantially have the same configurations and effects as those described in the first embodiment, and parts different from the first embodiment will be mainly described.

Figure 13:
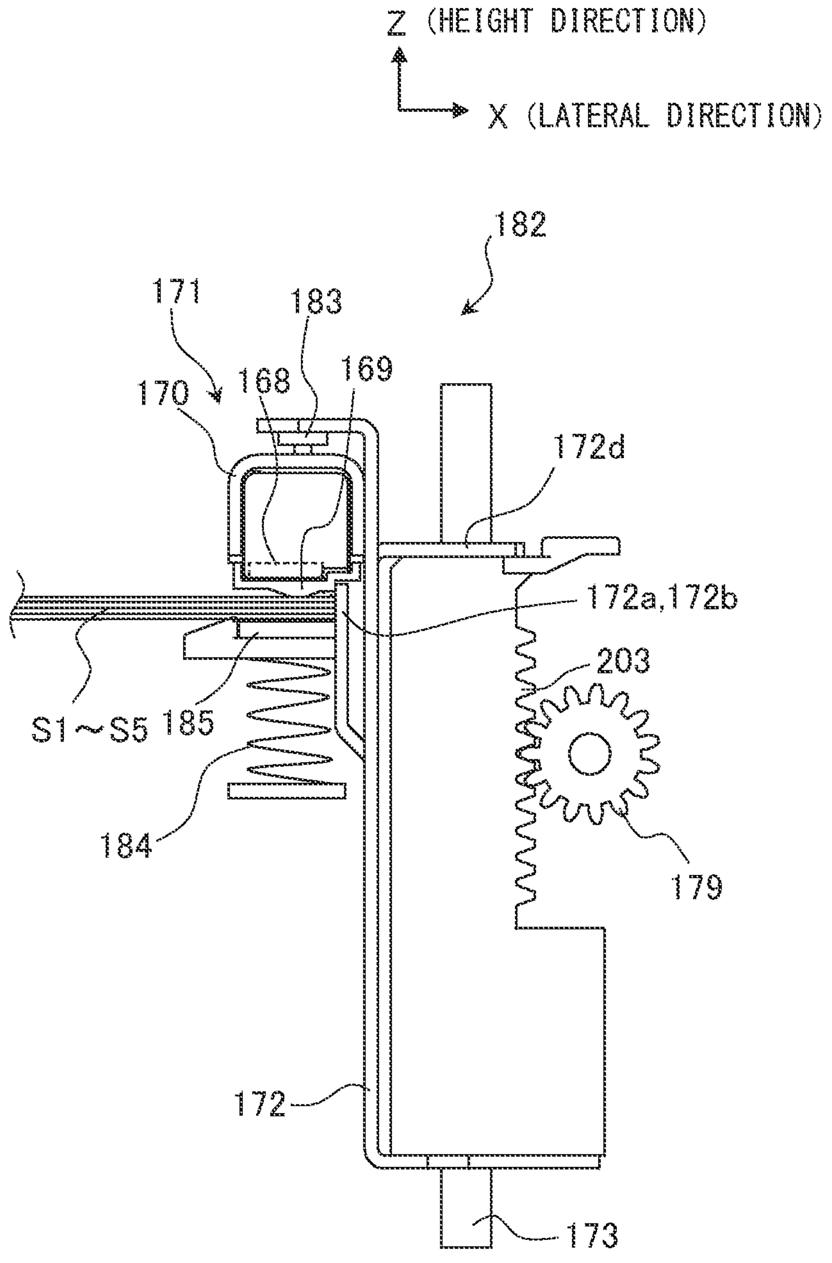
FIG. 13 is a diagram illustrating a heat-and-pressure bonding portion according to a fourth embodiment.

FIG. 13 is a diagram illustrating the heat-and-pressure bonding portion 182 according to the fourth embodiment as viewed in the sheet conveyance direction (Y direction). FIG. 20 is a flowchart illustrating a control example of the sheet processing apparatus 106 in the fourth embodiment.

As illustrated in FIG. 13, the heat-and-pressure bonding portion 182 of the fourth embodiment has a configuration in which the photo-interrupter 176 and the rib 172*e* of the lift plate 172 of the heat-and-pressure bonding portion 167 of the first embodiment are omitted. In addition, the heat-and-pressure bonding portion 182 of the fourth embodiment includes a load cell 183 (load detection portion or force detection portion) provided between the metal stay 170 of the pressurizing unit 171 and the lift plate 172. The load cell 183 is disposed to be interposed between the lift plate 172 and the metal stay 170 in the pressurizing direction (Z direction), and is fixed to the lift plate 172. The lift plate 172 and the metal stay 170 are coupled to each other with a small backlash therebetween in the Z direction.

The load cell 183 is capable of detecting a load (force) in the Z direction. The load detected by the load cell 183 has a value corresponding to the force applied to the pressurizing plate 169 in the Z direction. Therefore, the controller 106C illustrated in FIG. 17 can determine the magnitude of the pressurizing force applied to the sheet bundle on the basis of the load detected by the load cell 183 in a state in which the sheet bundle is nipped between the pressurizing plate 169 and the receiving plate 185. The form of the load cell 183 is not limited as long as the maximum value of the pressurizing force applied to the sheet bundle during heat-and-pressure bonding is included in the measurement range of the load cell 183, and various types such as a spring type and a strain gauge type can be used.

In addition, in the fourth embodiment, the placement of the elastic member is different from the first embodiment. The receiving plate 185 is slidable in the Z direction with respect to the frame body of the heat-and-pressure bonding portion 182, and a compression spring 184 serving as an elastic member is disposed under the receiving plate 185. One end of the compression spring 184 is connected with the receiving plate 185, and the other end of the compression spring 184 is connected with a member fixed to the frame body of the heat-and-pressure bonding portion 182.

Meanwhile, a rack gear 203 and the lift plate 172 of the fourth embodiment are fastened to each other so as to be relatively unmovable with respect to each other, and integrally move along the guide shaft 173. That is, in the fourth embodiment, the rack gear 203 and the pressurizing unit 171 integrally reciprocate in the Z direction by the driving force of the motor.

Here, the position of the rack gear 203 in the case of retracting the pressurizing plate 169 from the sheet bundle will be referred to as a first position. The position of the rack gear 203 where the pressurizing plate 169 has been moved from the position retracted from the sheet bundle toward the receiving plate 185 and has come into contact with the sheet bundle will be referred to as a second position. The position of the rack gear 203 while the pressurizing plate 169 and the receiving plate 185 are pressurizing the sheet bundle will be referred to as a third position.

The deformation amount of the compression spring 184 is constant while the rack gear 203 moves from the first position to the second position. In addition, in the case where the rack gear 203 moves from the second position to the third position, the deformation amount of the compression spring 184 increases in accordance with the movement amount from the second position, and the pressurizing plate 169 and the receiving plate 185 pressurize the sheet bundle by the restoration force of the compression spring 184. That is, the present embodiment is configured such that the deformation amount of the elastic member is constant while the moving portion moves from the first position to the second position. In addition, the present embodiment is configured such that in the case where the moving portion moves from the second position to the third position, the deformation amount of the elastic member increases in accordance with the movement amount from the second position, and the pressurizing member and the receiving member pressurize the sheet bundle by the restoration force of the elastic member.

As described above, in the present embodiment, a configuration in which the deformation amount of the compression spring 184 changes in accordance with the movement amount of the pressurizing unit 171 after the pressurizing plate 169 has come into contact with the sheet bundle is employed. According to this configuration, even if the thickness of the sheet bundle to be subjected to bonding changes, the sheet bundle is pressurized by the pressurizing plate 169 and the receiving plate 185 by the restoration force of the compression spring 184 corresponding to the movement amount of the pressurizing unit 171 from the time point at which the pressurizing plate 169 has come into contact with the sheet bundle. Therefore, more consistent pressurizing force can be applied to the sheet bundle than a configuration in which the deformation amount of the compression spring 184 at the time when the pressurizing plate 169 comes into contact with the sheet bundle changes in accordance with the thickness of the sheet bundle.

That is, also according to the configuration of the present embodiment in which the compression spring 184 (elastic member) is connected with the receiving plate 185 (receiving member), a sheet bonding apparatus (booklet making apparatus) and an image forming apparatus capable of adjusting the pressurizing force for bonding sheets together to a desired value can be provided. In addition, according to the present embodiment, fluctuation of the pressurizing force for bonding sheets together depending on the thickness of the sheet bundle can be reduced.

The heat-and-pressure bonding operation of the heat-and-pressure bonding portion 182 in the fourth embodiment will be described with reference to FIG. 20. To be noted, steps S105B and S106B are different from the first embodiment, and steps S101 to S104 and S107 to S110 can be performed in the same manner as in the first embodiment.

After the alignment of the sheets S1 to S5 in the width direction is completed, the controller 106C illustrated in FIG. 17 rotates the motor 177 in the normal direction in step S104, and thus moves the pressurizing unit 171 in the pressurizing direction (−Z direction). If the normal rotation of the motor 177 is continued after the pressurizing plate 169 has come into contact with the uppermost sheet S5, the receiving plate 185 is pushed in in the pressurizing direction (−Z direction), and the sheet bundle is pressurized by the restoration force of the compression spring 184. The controller 106C continues the normal rotation of the motor 177 until the load detected by the load cell 183 reaches a predetermined target value, and when the detected load reaches the target value, that is, in the case where the result of step S105B is Y, stops the motor 177 in step S106B. The predetermined target value is set in advance, and is, for example, stored in a storage device of the controller 106C illustrated in FIG. 17, and is read out by the CPU. As described above, by controlling the movement of the rack gear 175 such that the load detected by the load cell 183 is the target value, the deformation amount of the compression spring 184 can be made constant, that is, the pressurizing force applied to the sheet bundle can be made constant regardless of the thickness of the sheet bundle.

As described above, in the present embodiment, the movement of the rack gear 175 is controlled while monitoring the pressurizing force applied to the sheet bundle by using the load cell 183. In other words, the controller of the present embodiment controls the drive source such that the load detected by a load detection portion is a preset target value. As a result of this, the pressurizing force applied to the sheet bundle during heat-and-pressure bonding can be controlled with higher precision regardless of the thickness of the sheet bundle.

Modification Examples

To be noted, although the load cell 183 is provided on the pressurizing unit 171 side in the fourth embodiment, the load cell 183 may be disposed on the receiving plate 185 side. That is, it suffices as long as the load cell 183 (load detection portion) detects a load on the pressurizing plate 169 (pressurizing member) or the receiving plate 185 (receiving member). In addition, although the compression spring 184 serving as an elastic member is disposed on the receiving plate 185 side in the fourth embodiment, the compression spring 174 configured in a similar manner to the first embodiment may be used, and the compression spring 174 of the first embodiment and the compression spring 184 of the fourth embodiment may be used in combination. Also according to these modification examples, by controlling the movement of the rack gear 175 while monitoring the load detected by the load cell 183, the pressurizing force applied to the sheet bundle during heat-and-pressure bonding can be controlled with higher precision regardless of the thickness of the sheet bundle.

Fifth Embodiment

Figure 21:
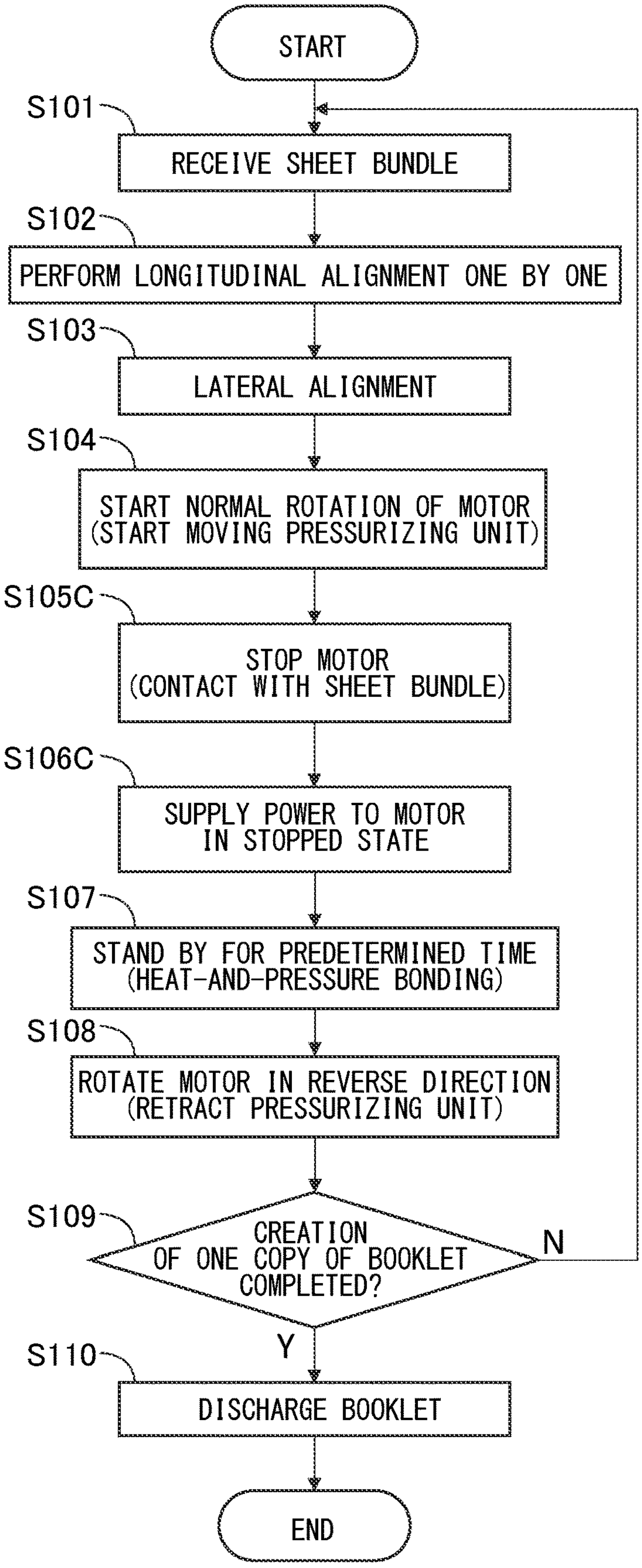
FIG. 21 is a flowchart illustrating a control example of a sheet processing apparatus according to the fifth embodiment.

A fifth embodiment will be described with reference to FIGS. 14 and 21. Part of the configuration of a heat-and-pressure bonding portion 186 of the present embodiment is different from the heat-and-pressure bonding portion 167 of the first embodiment, and elements of the image forming apparatus 100 other than the heat-and-pressure bonding portion 186 can be configured in the same manner as in the first embodiment. In the description below, it is assumed that elements denoted by the same reference signs as in the first embodiment substantially have the same configurations and effects as those described in the first embodiment, and parts different from the first embodiment will be mainly described.

Figure 14:
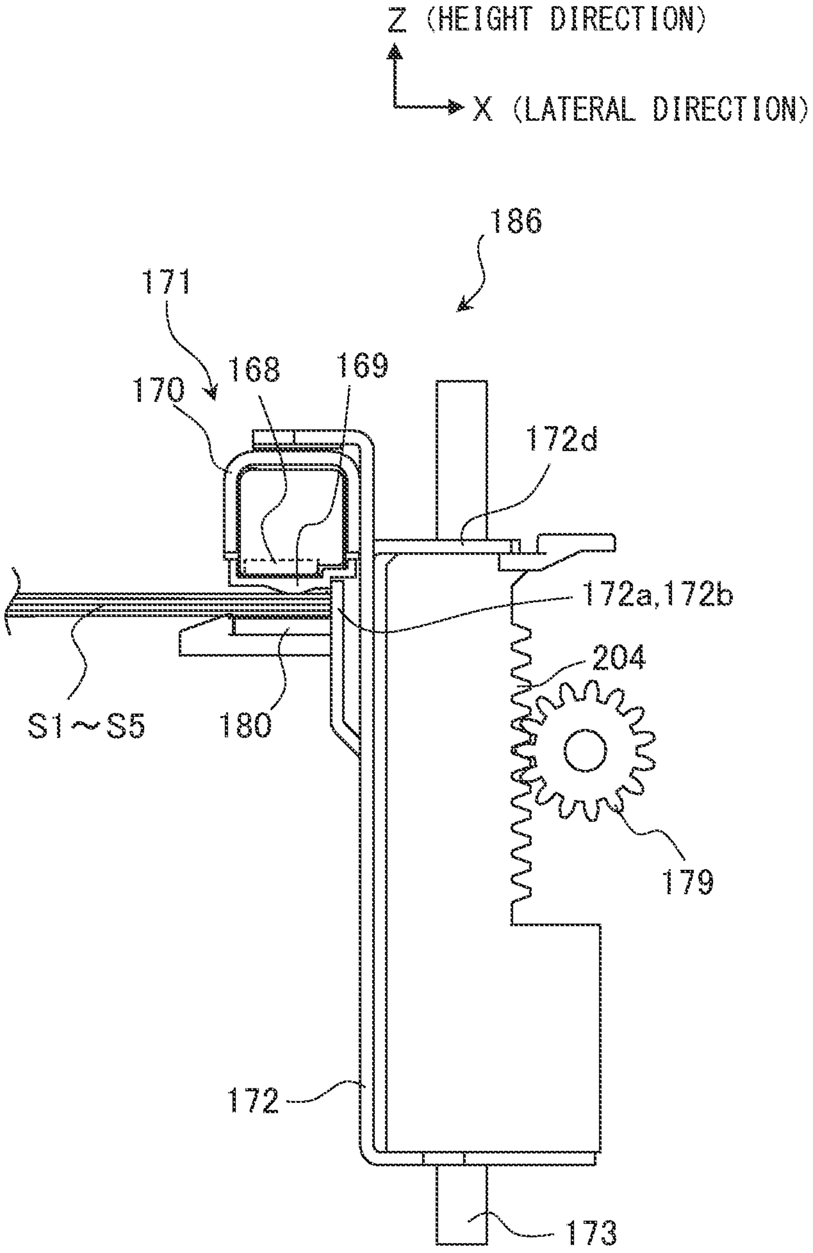
FIG. 14 is a diagram illustrating a heat-and-pressure bonding portion according to a fifth embodiment.

FIG. 14 is a diagram illustrating the heat-and-pressure bonding portion 186 according to the fifth embodiment as viewed in the sheet conveyance direction (Y direction). FIG. 21 is a flowchart illustrating a control example of the sheet processing apparatus 106 in the fifth embodiment.

As illustrated in FIG. 14, the heat-and-pressure bonding portion 186 of the fifth embodiment has a configuration in which the photo-interrupter 176 and the rib 172*e* of the lift plate 172 of the heat-and-pressure bonding portion 167 of the first embodiment are omitted. In addition, a rack gear 204 and the lift plate 172 of the fifth embodiment are fastened to each other so as to be relatively unmovable with respect to each other, and integrally move along the guide shaft 173. That is, in the fifth embodiment, the rack gear 204 and the pressurizing unit 171 integrally reciprocate in the Z direction by the driving force of the motor.

The heat-and-pressure bonding operation of the heat-and-pressure bonding portion 186 in the fifth embodiment will be described with reference to FIG. 21. To be noted, steps S105C and S106C are different from the first embodiment, and steps S101 to S104 and S107 to S110 can be performed in the same manner as in the first embodiment.

After the alignment of the sheets S1 to S5 in the width direction is completed, the controller 106C illustrated in FIG. 17 rotates the motor 177 in the normal direction in step S104, and thus moves the pressurizing unit 171 in the pressurizing direction (−Z direction). If the normal rotation of the motor 177 is continued after the pressurizing plate 169 has come into contact with the uppermost sheet S5, the receiving plate 180 is pushed in in the pressurizing direction (−Z direction), and the sheet bundle is pressurized by the restoration force of the compression spring 184. When the pressurizing plate 169 comes into contact with the sheet bundle, the movement of the pressurizing unit 171 is stopped, and the rotation of the motor 177 is also stopped in step S105C.

The controller 106C supplies power to the motor 177 in step S106C in a state in which the rotation thereof is stopped, and thus controls the torque (starting torque) for starting the rotation of the motor 177 whose rotation is stopped to a preset torque value. By controlling the starting torque of the motor 177 to a preset (predetermined) torque value, the pressurizing force that the pressurizing plate 169 and the receiving plate 180 apply to the sheet bundle can be controlled. That is, the controller of the present embodiment controls the output of the drive source such that the pressurizing force of the pressurizing member and the receiving member pressurizing the sheet bundle is a preset value.

The preset torque value is set in advance, and is, for example, stored in the storage device of the controller 106C illustrated in FIG. 17, and is read out by the CPU. The preset torque value may be set in consideration of the reduction ratio of the gear train 178 illustrated in FIG. 8 and loss derived from the friction of the gear train 178. The magnitude of the starting torque of the motor 177 can be managed by controlling the current supplied to the motor 177 to a predetermined value in accordance with the characteristics of the motor 177.

As described above, in the present embodiment, the pressurizing force applied to the sheet bundle during heat-and-pressure bonding can be controlled to a desired value by managing the starting torque of the motor 177 after the sheet bundle is nipped between the pressurizing plate 169 and the receiving plate 180 and the motor 177 is stopped. As a result of this, the pressurizing force applied to the sheet bundle during heat-and-pressure bonding can be controlled with higher precision regardless of the thickness of the sheet bundle. For example, the pressurizing force applied to the sheet bundle during heat-and-pressure bonding can be made constant regardless of the thickness of the sheet bundle.

To be noted, the type (direct current, alternate current, etc.) of the motor 177 serving as a drive source is not particularly limited as long as the output of the motor 177 in a state in which the sheet bundle is nipped between the pressurizing plate 169 and the receiving plate 180 and the movement of the pressurizing unit 171 is stopped can be controlled to a preset value. In addition, an actuator different from a motor (electric motor) may be used as a drive source.

Sixth Embodiment

Figure 22:
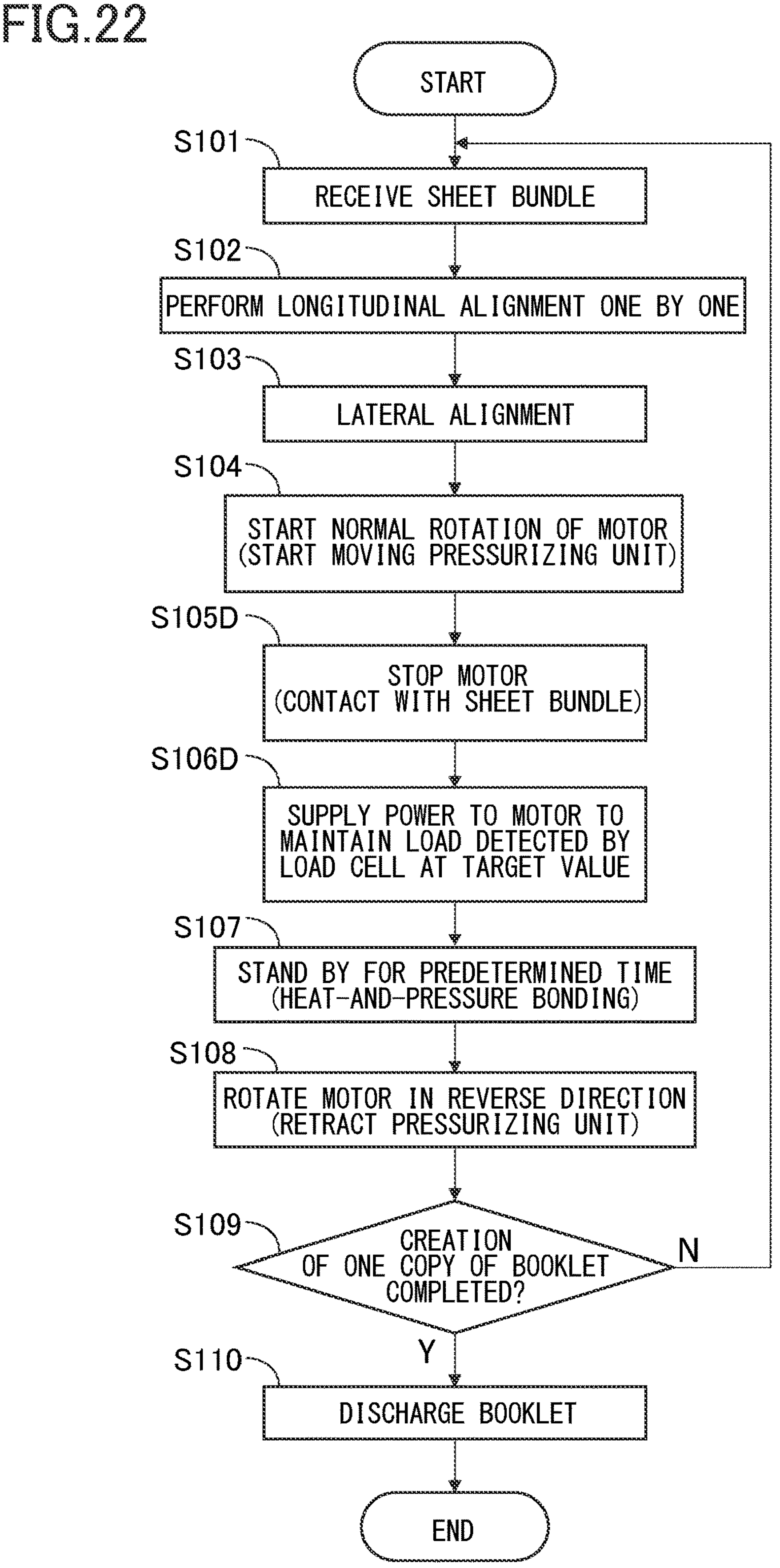
FIG. 22 is a flowchart illustrating a control example of a sheet processing apparatus according to the sixth embodiment.

A sixth embodiment will be described with reference to FIGS. 15 and 22. Part of the configuration of a heat-and-pressure bonding portion 187 of the present embodiment is different from the heat-and-pressure bonding portion 167 of the first embodiment, and elements of the image forming apparatus 100 other than the heat-and-pressure bonding portion 187 can be configured in the same manner as in the first embodiment. In the description below, it is assumed that elements denoted by the same reference signs as in the first embodiment substantially have the same configurations and effects as those described in the first embodiment, and parts different from the first embodiment will be mainly described.

Figure 15:
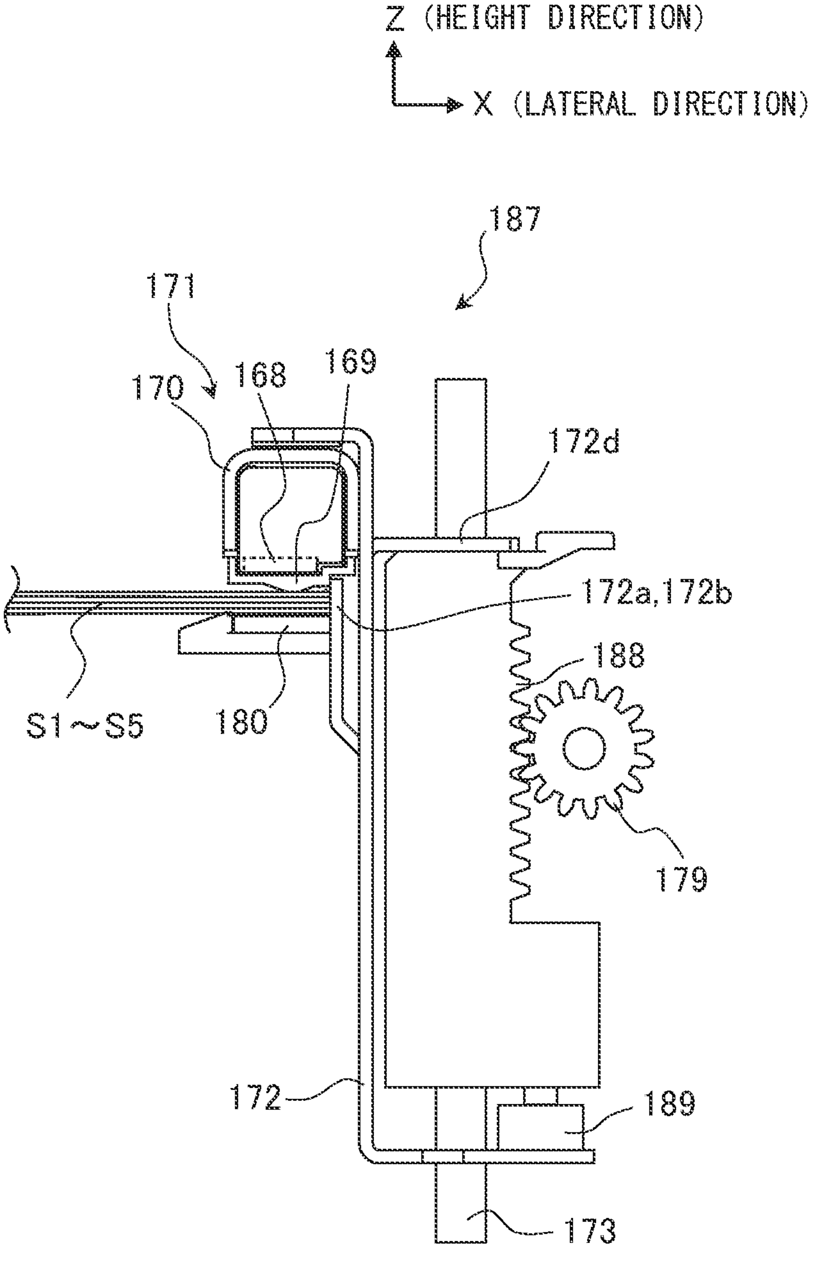
FIG. 15 is a diagram illustrating a heat-and-pressure bonding portion according to a sixth embodiment.

FIG. 15 is a diagram illustrating the heat-and-pressure bonding portion 187 according to the sixth embodiment as viewed in the sheet conveyance direction (Y direction). FIG. 22 is a flowchart illustrating a control example of the sheet processing apparatus 106 in the sixth embodiment.

As illustrated in FIG. 15, the heat-and-pressure bonding portion 187 of the sixth embodiment has a configuration in which the photo-interrupter 176 and the rib 172*e* of the lift plate 172 of the heat-and-pressure bonding portion 167 of the first embodiment are omitted. In addition, the heat-and-pressure bonding portion 187 of the sixth embodiment includes a load cell 189 (load detection portion or force detection portion) provided between a rack gear 188 and the lift plate 172. The load cell 189 is disposed to be interposed between the rack gear 188 and the lift plate 172 in the pressurizing direction (Z direction), and is fixed to the lift plate 172.

The load cell 189 is capable of detecting a load (force) in the Z direction. The load detected by the load cell 189 has a value corresponding to the force applied to the pressurizing plate 169 in the Z direction. Therefore, the controller 106C illustrated in FIG. 17 can determine the magnitude of the pressurizing force applied to the sheet bundle on the basis of the load detected by the load cell 189 in a state in which the sheet bundle is nipped between the pressurizing plate 169 and the receiving plate 180. The form of the load cell 189 is not limited as long as the maximum value of the pressurizing force applied to the sheet bundle during heat-and-pressure bonding is included in the measurement range of the load cell 189, and various types such as a spring type and a strain gauge type can be used.

In addition, in the sixth embodiment, the elastic members exemplified in the first to fourth embodiments are not disposed on either of the pressurizing unit 171 side and the receiving plate 180 side.

The heat-and-pressure bonding operation of the heat-and-pressure bonding portion 187 in the sixth embodiment will be described with reference to FIG. 22. To be noted, steps S105D and S106D are different from the first embodiment, and steps S101 to S104 and S107 to S110 can be performed in the same manner as in the first embodiment.

After the alignment of the sheets S1 to S5 in the width direction is completed, the controller 106C illustrated in FIG. 17 rotates the motor 177 in the normal direction, and thus moves the pressurizing unit 171 in the pressurizing direction (−Z direction) in step S104. If the normal rotation of the motor 177 is continued after the pressurizing plate 169 has come into contact with the uppermost sheet S5, the sheet bundle is pressurized. After the rotation of the motor 177 is stopped in step S105D, the controller 106C supplies power to the motor 177 in step S106D while managing the starting torque of the motor 177 such that the load detected by the load cell 189 is maintained at a predetermined target value. That is, the controller of the present embodiment controls the output of the drive source such that the load detected by the load detection portion while the pressurizing member and the receiving member are pressurizing the sheet bundle is a preset target value.

The predetermined target value is set in advance, and is, for example, stored in the storage device of the controller 106C illustrated in FIG. 17, and is read out by the CPU. As described above, by managing the starting torque of the motor 177 such that the torque detected by the load cell 189 is the target value, the pressurizing force applied to the sheet bundle can be made constant regardless of the thickness of the sheet bundle. The magnitude of the starting torque can be managed by, for example, controlling the motor current as described in the fifth embodiment.

As described above, in the present embodiment, the output of the motor 177 is controlled while monitoring the pressurizing force applied to the sheet bundle by using the load cell 189. As a result of this, the pressurizing force applied to the sheet bundle during heat-and-pressure bonding can be controlled with higher precision regardless of the thickness of the sheet bundle.

Modification Examples

To be noted, although the load cell 189 is disposed on the pressurizing unit 171 side (between the rack gear 188 and the lift plate 172) in the sixth embodiment, the load cell 189 may be disposed at a different position. For example, the load cell may be disposed on the receiving plate 180 side.

To be noted, the type (direct current, alternate current, etc.) of the motor 177 serving as a drive source is not particularly limited as long as the output of the motor 177 in a state in which the sheet bundle is nipped between the pressurizing plate 169 and the receiving plate 180 and the movement of the pressurizing unit 171 is stopped can be controlled. In addition, an actuator different from a motor (electric motor) may be used as a drive source.

Seventh Embodiment

A seventh embodiment will be described with reference to FIGS. 16A to 16C and 23. Part of the configuration of a heat-and-pressure bonding portion 200 of the present embodiment is different from the heat-and-pressure bonding portion 167 of the first embodiment, and elements of the image forming apparatus 100 other than the heat-and-pressure bonding portion 200 can be configured in the same manner as in the first embodiment. In the description below, it is assumed that elements denoted by the same reference signs as in the first embodiment substantially have the same configurations and effects as those described in the first embodiment, and parts different from the first embodiment will be mainly described.

Figure 16C:
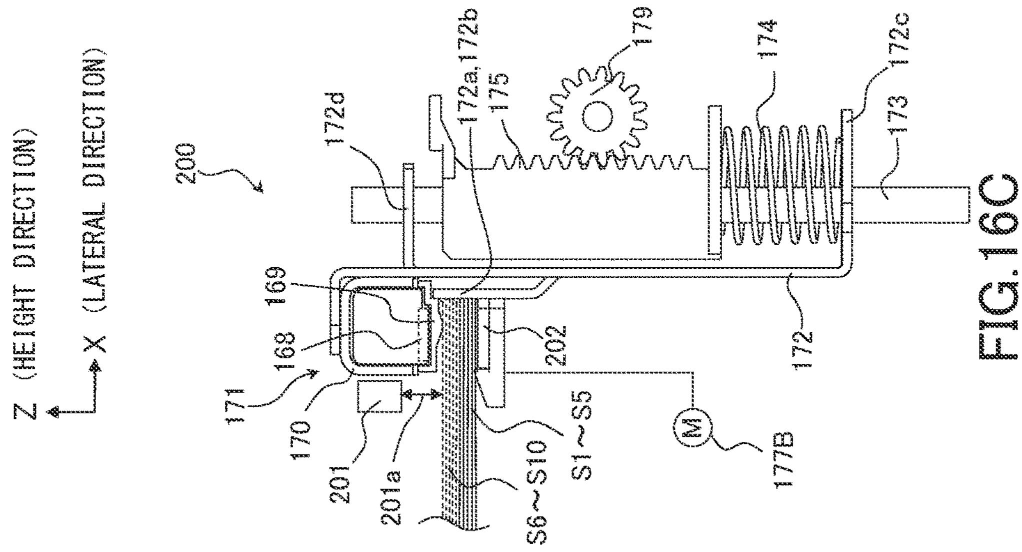
FIGS. 16A to 16C are diagrams illustrating a heat-and-pressure bonding portion according to a seventh embodiment.
Figure 16B:
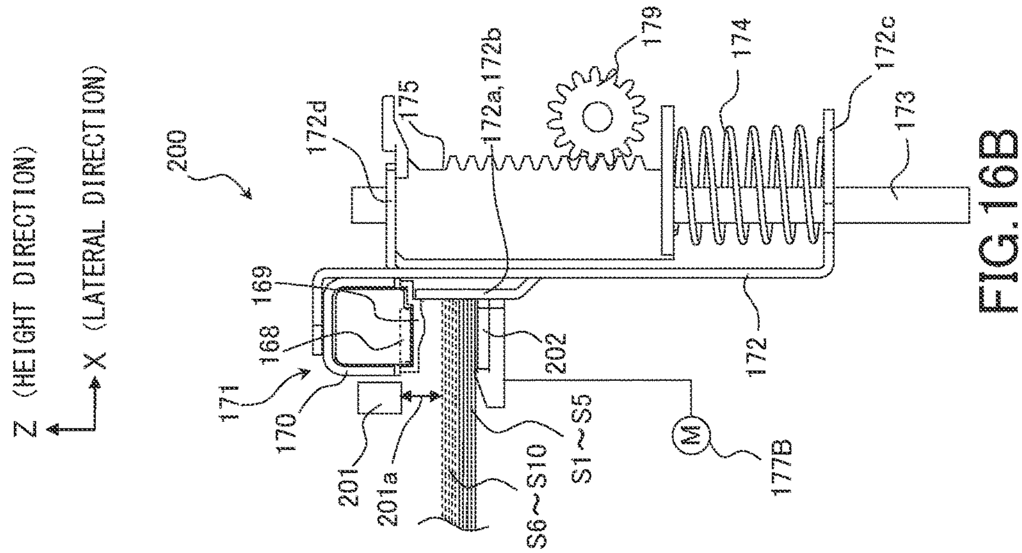
Figure 16A:
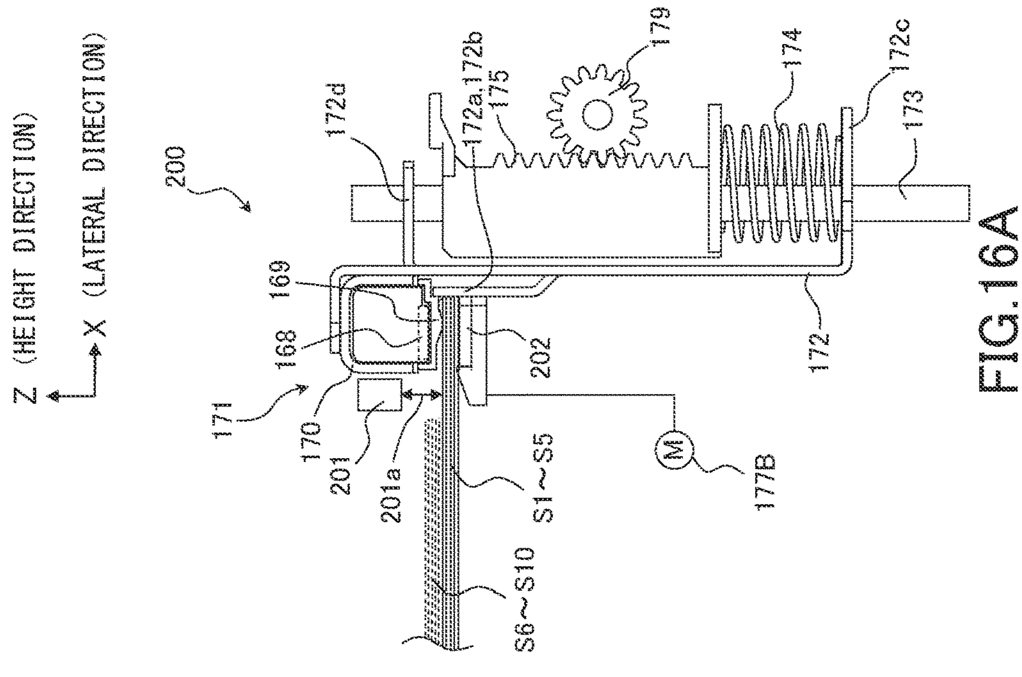
Figure 23:
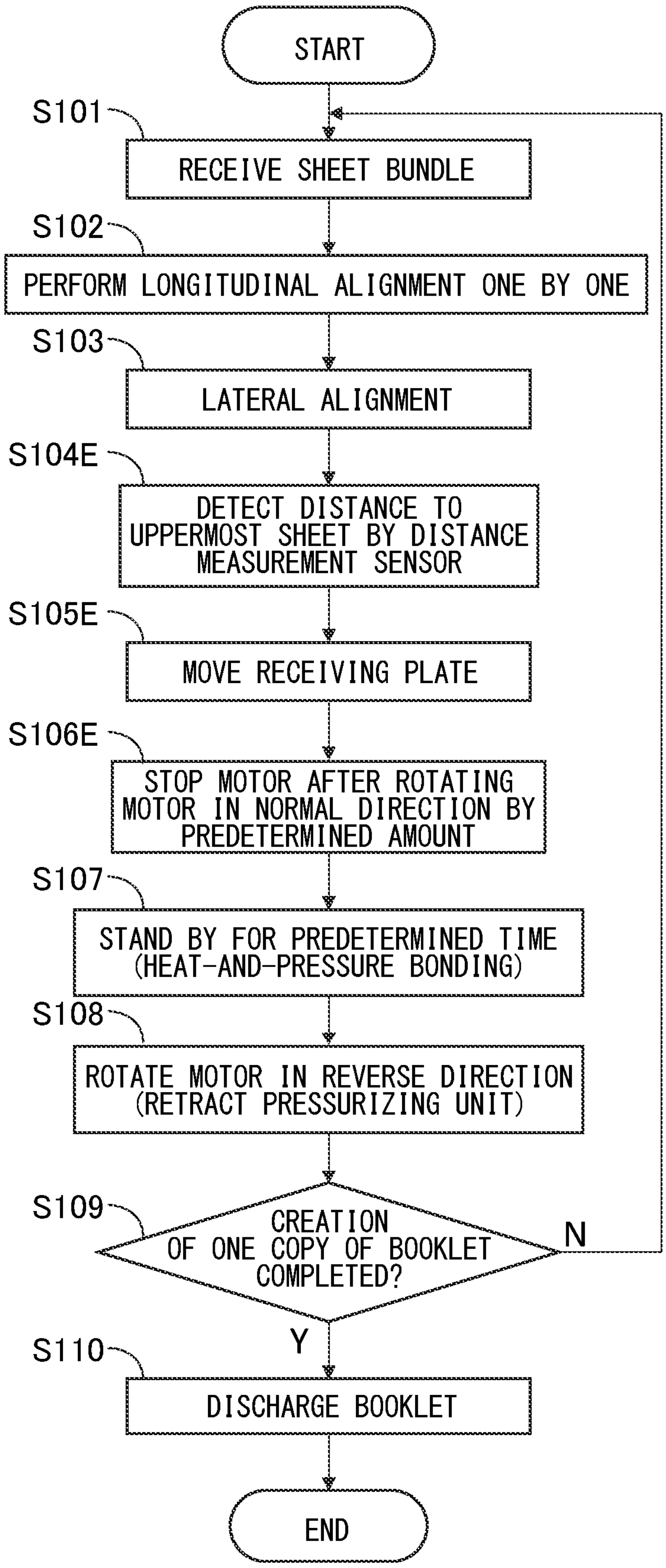
FIG. 23 is a flowchart illustrating a control example of a sheet processing apparatus according to the seventh embodiment.

FIGS. 16A to 16C are each a diagram illustrating the heat-and-pressure bonding portion 200 according to the seventh embodiment as viewed in the sheet conveyance direction (Y direction). FIG. 23 is a flowchart illustrating a control example of the sheet processing apparatus 106 in the seventh embodiment.

As illustrated in FIG. 16, the heat-and-pressure bonding portion 200 of the seventh embodiment has a configuration in which the photo-interrupter 176 and the rib 172$e$ of the lift plate 172 of the heat-and-pressure bonding portion 167 of the first embodiment are omitted. In addition, the heat-and-pressure bonding portion 200 of the seventh embodiment includes a distance measurement sensor 201 capable of detecting the distance to the uppermost sheet of the sheet bundle serving as a bonding target. The distance measurement sensor 201 is fixed to the frame body of the heat-and-pressure bonding portion 200. The distance measurement sensor 201 is an example of a position detection portion capable of detecting the position of the uppermost sheet of the sheet bundle serving as a bonding target (upper surface of the sheet bundle).

In addition, in the seventh embodiment, a receiving plate 202 serving as a receiving member is configured to be movable in the Z direction. The receiving plate 202 is configured to be movable independently from the movement of the pressurizing unit 171 via the rack gear 175 (first moving portion), by a second moving portion 177B including a motor and a drive transmission mechanism (such as a rack-and-pinion mechanism) that are not illustrated.

The heat-and-pressure bonding operation of the heat-and-pressure bonding portion 200 in the seventh embodiment will be described with reference to FIGS. 16A to 16C and 23. To be noted, steps S104E to S106E are different from the first embodiment, and steps S101 to S103 and S107 to S110 can be performed in the same manner as the first embodiment.

After the alignment of the sheets S1 to S5 in the width direction is completed, the controller 106C illustrated in FIG. 17 detects the distance to the uppermost sheet S5 by using the distance measurement sensor 201 in step S104E, and moves the receiving plate 202 in the Z direction in step S105E on the basis of the detected distance. The position to which the receiving plate 202 is moved is a position where a distance 201$a$ illustrated in FIG. 16A from the distance measurement sensor 201 to the uppermost sheet S5 is equal to a preset value. The preset value of the distance 201$a$ is, for example, stored in the storage device of the controller 106C, and is read out by the CPU.

After moving the receiving plate 202, the controller 106C rotates the motor 177 in the normal direction to move the pressurizing unit 171 in the pressurizing direction (−Z direction), and stops the motor 177 in step S106E after driving the motor 177 by a predetermined driving amount. As a result of this, as illustrated in FIG. 16A, the deformation amount of the compression spring 174 becomes a predetermined amount, and the heat-and-pressure bonding of the sheets S1 to S5 is performed in step S107 in a state in which the pressurizing plate 169 and the receiving plate 202 are pressurizing the sheets S1 to S5 by the restoration force of the compression spring 174. The predetermined driving amount is set in advance, and is, for example, stored in the storage device of the controller 106C illustrated in FIG. 17, and is read out by the CPU.

In the case of further performing heat-and-pressure bonding of the sheets S6 to S10 after the heat-and-pressure bonding of the sheets S1 to S5, the sheets S6 to S10 are stacked on the sheets S1 to S5 as illustrated in FIG. 16B, and the sheets are aligned. After the alignment of the sheets S6 to S10 in the sheet width direction is completed, the controller 106C detects the distance to the uppermost sheet S10 by using the distance measurement sensor 201 in step S104E, and moves the receiving plate 202 in the Z direction in step S105E on the basis of the detected distance. The position to which the receiving plate 202 is moved is a position illustrated in FIG. 16C where the distance 201*a* from the distance measurement sensor 201 to the uppermost sheet S10 is equal to a preset value. Since the distance 201*a* from the distance measurement sensor 201 to the uppermost sheet of the sheet bundle is maintained at the preset value, the receiving plate 202 is moved in a direction away from the pressurizing plate 169 (−Z direction) as compared with the state of FIG. 16A.

After moving the receiving plate 202, the controller 106C rotates the motor 177 in the normal direction to move the pressurizing unit 171 in the pressurizing direction (−Z direction), and stops the motor 177 in step S106E after driving the motor 177 by a predetermined driving amount. The predetermined driving amount described above is the same as the driving amount of the motor 177 for the first heat-and-pressure bonding on the sheets S1 to S5. As a result of this, as illustrated in FIG. 16C, the deformation amount of the compression spring 174 becomes a predetermined amount, and the heat-and-pressure bonding of the sheets S6 to S10 is performed in step S107 in a state in which the deformation amount of the compression spring 174 is the predetermined amount and the pressurizing plate 169 and the receiving plate 202 are pressurizing the sheets S1 to S10 by the restoration force of the compression spring 174.

As described above, in the seventh embodiment, the receiving plate 202 is moved on the basis of the detection result of the distance measurement sensor 201 (position detection portion) such that the uppermost sheet is positioned at a preset target position in the Z direction regardless of the thickness of the sheet bundle. As a result of this, if the motor 177 is rotated in the normal direction by a predetermined driving amount that is set in advance, the pressurizing plate 169 and the receiving plate 202 can pressurize the sheet bundle by the same pressurizing force every time.

In other words, the controller of the present embodiment causes the second moving portion to move the receiving member such that the uppermost sheet of the sheet bundle is moved to a preset position on the basis of the detection result of the position detection portion. Then, the controller of the present embodiment causes the pressurizing member and the receiving member to pressurize the sheet bundle by the restoration force of the elastic member by moving the first moving portion by a preset movement amount. As a result of this, the pressurizing force applied to the sheet bundle during heat-and-pressure bonding can be made closer to a desired value.

In addition, according to the present embodiment, the driving amount for rotating the motor 177 in the reverse direction in the case of moving the pressurizing unit 171 from the pressurizing position to the retracted position can be also made constant regardless of the thickness of the sheet bundle.

Modification Examples

To be noted, as long as a configuration in which the uppermost sheet can be positioned at the preset target position is employed, a position detection portion different from the distance measurement sensor 201 may be used. A sensor in which a lever that swings by abutting the uppermost sheet and a photo-interrupter whose light is blocked by the lever are combined (sensor that detects presence or absence of the sheet at the target position) may be used.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-044784, filed on Mar. 20, 2023, which is hereby incorporated by reference herein in its entirety.

As described above, according to the present disclosure, a booklet making apparatus and an image forming apparatus capable of adjusting the pressurizing force for bonding sheets together to a desired value can be provided.

What is claimed is:

1. A booklet making apparatus comprising:

a heat-and-pressure bonding portion configured to heat and pressurize a sheet, the heat-and-pressure bonding portion including:

a pressurizing member configured to come into contact with and pressurize the sheet, a receiving member configured to oppose the pressurizing member, a moving portion configured to move the pressurizing member such that the pressurizing member and the receiving member nip and pressurize the sheet, and a heating portion configured to heat the pressurizing member, wherein the booklet making apparatus is configured to nip, heat, and pressurize, between the pressurizing member and the receiving member, a plurality of sheets on at least one of which an adhesive layer is formed, and thus make a booklet in which the plurality of sheets are bonded to each other via the adhesive layer, wherein the booklet making apparatus further comprises:

an elastic member configured to generate an urging force for applying a pressure between the pressurizing member and the receiving member, and wherein in a case where a first position is a position of the moving portion in a case of retracting the pressurizing member from the plurality of sheets, a second position is a position of the moving portion when the pressurizing member comes into contact with the plurality of sheets in a case where the pressurizing member is moved from a position retracted from the plurality of sheets toward the receiving member, and a third position is a position of the moving portion while the pressurizing member and the receiving member are pressurizing the plurality of sheets, (i) a deformation amount of the elastic member is constant while the moving portion moves from the first position to the second position, and (ii) in a case where the moving portion moves from the second position to the third position, the deformation amount of the elastic member increases in accordance with a movement amount of the moving portion from the second position.

2. The booklet making apparatus according to claim 1, further comprising:

a drive source configured to drive the moving portion;

a detection portion configured to detect contact of the pressurizing member with a sheet; and a controller configured to control a driving amount of the drive source on a basis of a detection result of the detection portion.

3. The booklet making apparatus according to claim 2, wherein a driving amount of the drive source between (i) detection of contact of the pressurizing member with a sheet bundle, in which the plurality of sheets are stacked, by the detection portion and (ii) stoppage of the drive source is the same for a case where a thickness of the sheet bundle is a first thickness and a case where the thickness of the sheet bundle is a second thickness larger than the first thickness.

4. The booklet making apparatus according to claim 2, wherein the heat-and-pressure bonding portion includes a pressurizing unit that includes the pressurizing member and that is configured to be moved by the moving portion, wherein the elastic member is provided between the pressurizing unit and the moving portion, and wherein the detection portion is configured to detect change in a positional relationship between the pressurizing unit and the moving portion.

5. The booklet making apparatus according to claim 4, wherein the detection portion is a sensor provided in one of the pressurizing unit and the moving portion, and is configured to detect, by using light, a detected portion provided in another of the pressurizing unit and the moving portion.

6. The booklet making apparatus according to claim 4, further comprising:

a guide shaft configured to guide the moving portion and the pressurizing unit such that the moving portion and the pressurizing unit move in a pressurizing direction of the plurality of sheets, wherein the elastic member is a compression spring disposed around the guide shaft.

7. The booklet making apparatus according to claim 1, further comprising:

a drive source configured to drive the moving portion;

an estimating portion configured to estimate a timing at which the pressurizing member comes into contact with the plurality of sheets; and a controller configured to control a driving amount of the drive source on a basis of an estimation result of the estimating portion.

8. The booklet making apparatus according to claim 7, wherein the estimating portion is configured to estimate a thickness of the plurality of sheets on a basis of the number of sheets included in the plurality of sheets.

9. The booklet making apparatus according to claim 7, further comprising:

a thickness detection portion configured to detect information about a thickness per sheet, wherein the estimating portion is configured to estimate a thickness of the plurality of sheets on a basis of the number of sheets included in the plurality of sheets and a detection result of the thickness detection portion.

10. The booklet making apparatus according to claim 1, further comprising:

a drive source configured to drive the moving portion; and a controller configured to move the moving portion from the second position to the third position by driving the drive source by a preset driving amount after allowing the moving portion to move from the first position to the second position by a weight of the pressurizing member.

11. The booklet making apparatus according to claim 1, further comprising:

a drive source configured to drive the moving portion;

a load detection portion configured to detect a load applied to the pressurizing member or the receiving member; and a controller configured to control the drive source such that the load detected by the load detection portion is a preset target value.

12. The booklet making apparatus according to claim 1, further comprising:

a plate member connected with the pressurizing member, wherein one end of the elastic member is connected with the moving portion, and another end of the elastic member is connected with the plate member.

13. The booklet making apparatus according to claim 1, wherein one end of the elastic member is connected with the receiving member, and another end of the elastic member is connected with a member fixed to a frame body of the booklet making apparatus.

14. A booklet making apparatus comprising:

a heat-and-pressure bonding portion configured to heat and pressurize a sheet, the heat-and-pressure bonding portion including:

a pressurizing member configured to come into contact with and pressurize the sheet, a receiving member configured to oppose the pressurizing member, a moving portion configured to move the pressurizing member such that the pressurizing member and the receiving member nip and pressurize the sheet, and a heating portion configured to heat the pressurizing member, wherein the booklet making apparatus is configured to nip, heat, and pressurize, between the pressurizing member and the receiving member, a plurality of sheets on at least one of which an adhesive layer is formed, and thus make a booklet in which the plurality of sheets are bonded to each other via the adhesive layer, wherein the booklet making apparatus further comprises:

an elastic member configured to generate an urging force for applying a pressure between the pressurizing member and the receiving member;

a drive source configured to drive the moving portion;

a detection portion configured to detect contact of the pressurizing member with the plurality of sheets; and a controller configured to control a driving amount of the drive source on a basis of a detection result of the detection portion, wherein the controller is configured to adjust a driving amount of the drive source between (i) detection of contact of the pressurizing member with the plurality of sheets by the detection portion and (ii) stoppage of the drive source, wherein the heat-and-pressure bonding portion includes a pressurizing unit that includes the pressurizing member and that is configured to be moved by the moving portion, wherein the elastic member is provided between the pressurizing unit and the moving portion, and wherein the detection portion is configured to detect change in a positional relationship between the pressurizing unit and the moving portion.

15. The booklet making apparatus according to claim 14, wherein the detection portion is a sensor provided in one of the pressurizing unit and the moving portion, and is configured to detect, by using light, a detected portion provided in another of the pressurizing unit and the moving portion.

16. The booklet making apparatus according to claim 14, further comprising:

a guide shaft configured to guide the moving portion and the pressurizing unit such that the moving portion and the pressurizing unit move in a pressurizing direction of the plurality of sheets, wherein the elastic member is a compression spring disposed around the guide shaft.

17. The booklet making apparatus according to claim 14, further comprising:

an estimating portion configured to estimate a timing at which the pressurizing member comes into contact with the plurality of sheets, wherein the controller is configured to control the driving amount of the drive source on a basis of an estimation result of the estimating portion.

18. The booklet making apparatus according to claim 17, wherein the estimating portion is configured to estimate a thickness of the plurality of sheets on a basis of the number of sheets included in the plurality of sheets.

19. The booklet making apparatus according to claim 17, further comprising:

a thickness detection portion configured to detect information about a thickness per sheet, wherein the estimating portion is configured to estimate a thickness of the plurality of sheets on a basis of the number of sheets included in the plurality of sheets and a detection result of the thickness detection portion.

20. A booklet making apparatus comprising:

a heat-and-pressure bonding portion configured to heat and pressurize a sheet, the heat-and-pressure bonding portion including:

a pressurizing member configured to come into contact with and pressurize the sheet, a receiving member configured to oppose the pressurizing member, a moving portion configured to move the pressurizing member such that the pressurizing member and the receiving member nip and pressurize the sheet, a heating portion configured to heat the pressurizing member, and wherein the booklet making apparatus is configured to nip, heat, and pressurize, between the pressurizing member and the receiving member, a plurality of sheets on at least one of which an adhesive layer is formed, and thus make a booklet in which the plurality of sheets are bonded to each other via the adhesive layer, wherein the booklet making apparatus further comprises:

an elastic member configured to generate an urging force for applying a pressure between the pressurizing member and the receiving member;

a drive source configured to drive the moving portion;

a detection portion configured to detect contact of the pressurizing member with the plurality of sheets;

a controller configured to control a driving amount of the drive source on a basis of a detection result of the detection portion; and a plate member connected with the pressurizing member, wherein the controller is configured to adjust a driving amount of the drive source between (i) detection of contact of the pressurizing member with the plurality of sheets by the detection portion and (ii) stoppage of the drive source, and wherein one end of the elastic member is connected with the moving portion, and another end of the elastic member is connected with the plate member.

21. The booklet making apparatus according to claim 14, wherein one end of the elastic member is connected with the receiving member, and another end of the elastic member is connected with a member fixed to a frame body of the booklet making apparatus.

22. An image forming apparatus comprising:

an image forming apparatus body configured to form images on sheets and apply an adhesive on the sheets, while conveying the sheets one by one; and the booklet making apparatus according to claim 1 configured to make a booklet by stacking and bonding a plurality of sheets received from the image forming apparatus body.

* * * * *